US012598507B2

(12) United States Patent
Zhu et al.

(10) Patent No.: US 12,598,507 B2
(45) Date of Patent: Apr. 7, 2026

(54) DATA TRANSMISSION METHOD, DEVICE, AND SYSTEM

(71) Applicant: Huawei Technologies Co., Ltd., Shenzhen (CN)

(72) Inventors: Hualin Zhu, Shanghai (CN); Huan Li, Shenzhen (CN); Weisheng Jin, Shanghai (CN)

(73) Assignee: Huawei Technologies Co., Ltd., Shenzen (CN)

( * ) Notice: Subject to any disclaimer, the term of this patent is extended or adjusted under 35 U.S.C. 154(b) by 328 days.

(21) Appl. No.: 17/869,518

(22) Filed: Jul. 20, 2022

(65) Prior Publication Data

US 2022/0353731 A1      Nov. 3, 2022

Related U.S. Application Data

(63) Continuation      of      application      No. PCT/CN2020/073535, filed on Jan. 21, 2020.

(51) Int. Cl.
*H04W 28/02*            (2009.01)
*H04L 47/283*          (2022.01)
(Continued)

(52) U.S. Cl.
CPC ....... *H04W 28/0268* (2013.01); *H04L 47/283* (2013.01); *H04W 28/0236* (2013.01); *H04W 28/24* (2013.01); *H04W 72/1221* (2013.01)

(58) Field of Classification Search
CPC ......... H04W 28/0268; H04W 28/0236; H04W 28/24; H04W 72/52; H04W 76/12; H04W 76/22; H04W 72/1221; H04L 47/283
See application file for complete search history.

(56) References Cited

U.S. PATENT DOCUMENTS

2017/0164404 A1* 6/2017 Sundararajan ........ H04L 1/0018
2019/0320445 A1  10/2019 Panigrahi et al.
(Continued)

FOREIGN PATENT DOCUMENTS

CN            103843383 A      6/2014
CN            109688594 A      4/2019
(Continued)

OTHER PUBLICATIONS

China Telecom et al., "Addition of the QoS Monitoring Validity Timer in the Solution #8 for Key Issue #4", 3GPP SA WG2 Meeting #129bis, S2-1813291, Nov. 26-30, 2018, 4 pages, West Palm Beach, USA.

(Continued)

*Primary Examiner* — Omer S Mian
(74) *Attorney, Agent, or Firm* — Slater Matsil, LLP

(57)            ABSTRACT

In a data transmission method, a first communication device obtains a data packet in a first direction, and obtains a data packet in a second direction. The two data packet correspond to a same service. If the first direction is an uplink direction, the second direction is a downlink direction; or if the first direction is a downlink direction, the second direction is an uplink direction. The first communication device determines a target transmission delay in the second direction based on a total transmission delay requirement and a time point at which the data packet in the first direction is sent. The first communication device sends the data packet in the second direction based on the target transmission delay in the second direction. The total transmission delay requirement is a sum of a transmission delay requirement in the first direction and a transmission delay requirement in the second direction.

20 Claims, 12 Drawing Sheets

(51) Int. Cl.
    *H04W 28/24*       (2009.01)
    *H04W 72/12*       (2023.01)

(56)              References Cited

U.S. PATENT DOCUMENTS

| | | | |
|---|---|---|---|
| 2020/0313984 A1* | 10/2020 | Lee | H04L 65/765 |
| 2021/0274389 A1 | 9/2021 | Wang | |
| 2021/0400536 A1* | 12/2021 | Itoh | H04W 28/18 |
| 2022/0345929 A1* | 10/2022 | Lee | H04L 43/0852 |
| 2024/0373295 A1* | 11/2024 | Wang | H04W 24/08 |

FOREIGN PATENT DOCUMENTS

| | | | |
|---|---|---|---|
| CN | 110062426 A | 7/2019 | |
| EP | 2391159 A1 | 11/2001 | |
| EP | 2892190 A1 | 7/2015 | |

OTHER PUBLICATIONS

Intel, "Discussion on E2E delay measurements and control", 3GPP TSG-SA5 Meeting #126, S5-195156, Aug. 19-23, 2019, 5 pages, Bruges, Belgium.
Intel: "Discussion on E2E delay measurements and control", 3GPP DraftS5-195156,Aug. 18, 2019, XP051760945, total 5 pages.

\* cited by examiner

DATA TRANSMISSION METHOD, DEVICE, AND SYSTEM

CROSS-REFERENCE TO RELATED APPLICATIONS

This application is a continuation of International Patent Application No. PCT/CN2020/073535, filed on Jan. 21, 2020, which is hereby incorporated by reference in its entirety.

TECHNICAL FIELD

This application relates to the communication field, and in particular, to a data transmission method, a device, and a system.

BACKGROUND

There are many types of services on a network, for example, a conversational service, a streaming service, an interactive service, and a background service. In specific application, some services are sensitive to a transmission delay. For example, the interactive service is very sensitive to a total transmission delay of data. The interactive service is a service that offers a strong interaction relationship between users or between a user and an environment. For example, a cloud virtual reality (VR) technology service is the interactive service.

FIG. 1 is an example of a scenario diagram of an interactive service. As shown in FIG. 1, a user holds a sensor in a hand. When the user raises the hand, the sensor in the hand of the user sends data corresponding to a "hand-raising action" to a server. After processing the received uplink data corresponding to the "hand-raising action", the server generates downlink data corresponding to the "hand-raising action", and sends the downlink data corresponding to the "hand-raising action" to a display (where a mirror indicates the display in FIG. 1) of a terminal device, to display the hand-raising action. The user finally sees the "hand-raising action" on the display. As shown in FIG. 1, it can be seen that, from a time point at which the user raises the hand to a time point at which the user sees the hand-raising action on the display, uplink transmission and downlink transmission are performed on the data. It can be seen that a sum of an uplink transmission delay and a downlink transmission delay affects real-time performance of an image corresponding to the "hand-raising action" seen by the user on the display.

In a conventional technology, a server sends a quality of service (QoS) requirement of a service (where for example, an uplink transmission delay requirement of a VR service is 10 milliseconds (ms), and a downlink transmission delay requirement of the VR service is 20 ms) to a network. The network separately establishes corresponding QoS flows for uplink transmission and downlink transmission, and the QoS flow corresponds to a quality of service parameter. Uplink data transmission and downlink data transmission are performed between a terminal device and the network through the established QoS flows, to ensure a service transmission delay.

However, currently, rough QoS control can be performed only on all data of an uplink service flow and all data of a downlink service flow. Therefore, a data transmission solution is urgently needed to control a data transmission delay more accurately.

SUMMARY

Embodiments of this application provide a data transmission method, a device, and a system, to control a data transmission delay more accurately.

To achieve the foregoing objective, the following technical solutions are used in embodiments of this application.

According to a first aspect, a data transmission method is provided. The method includes a first communication device receives a data packet in a first direction, where the data packet in the first direction includes a time stamp that indicates a time point at which the data packet in the first direction is sent, the first communication device receives a data packet in a second direction, where the data packet in the first direction and the data packet in the second direction correspond to a same service, and if the first direction is an uplink direction, the second direction is a downlink direction, or if the first direction is a downlink direction, the second direction is an uplink direction, and the first communication device sends the data packet in the second direction based on a total transmission delay requirement and the time point at which the data packet in the first direction is sent, where the total transmission delay requirement is a sum of a transmission delay requirement in the first direction and a transmission delay requirement in the second direction. In this way, the data packet in the second direction can be scheduled based on the total transmission delay requirement and the sending time in the first direction of the service, and delay control can be performed on the data packet in the second direction used as a finer granularity.

In a possible implementation, the data packet in the first direction includes a group identifier, and the data packet in the second direction includes a group identifier. After that the first communication device receives a data packet in a second direction and before that the first communication device sends the data packet in the second direction, the method further includes, if the first communication device determines that the group identifier of the data packet in the second direction has an association relationship with the group identifier of the data packet in the first direction, the first communication device determines that the data packet in the first direction and the data packet in the second direction correspond to the same service. In this way, the data packet in the first direction and the data packet in the second direction that have a correspondence can be determined by using the group identifiers, to lay a foundation for scheduling a data packet at a finer granularity.

In a possible implementation, a group identifier included in an uplink data packet is carried at an internet protocol IP layer or a general packet radio service tunneling protocol GTP layer of the uplink data packet, and/or a group identifier included in a downlink data packet is carried at an IP layer of the downlink data packet.

In a possible implementation, that the first communication device sends the data packet in the second direction based on a total transmission delay requirement and the time point at which the data packet in the first direction is sent includes the first communication device determines a target transmission delay in the second direction based on a difference between the total transmission delay requirement and the transmission delay in the first direction, and the first communication device sends the data packet in the second direction based on the target transmission delay in the second direction. Because the data packet in the first direction includes the time stamp, the transmission delay in the first direction may be determined. Further, because the first communication device determines the target transmission delay in the second direction based on the difference between the total transmission delay requirement and the transmission delay in the first direction, a transmission delay of the data packet in the second direction is controlled at a finer granularity.

In a possible implementation, that the first communication device sends the data packet in the second direction based on a total transmission delay requirement and the time point at which the data packet in the first direction is sent includes the first communication device determines a target transmission delay in the second direction based on a difference between the total transmission delay requirement and duration, where the duration is between a time point at which the first communication device receives the data packet in the second direction and the time point at which the data packet in the first direction is sent, and the first communication device sends the data packet in the second direction based on the target transmission delay in the second direction. Because the data packet in the first direction includes the time stamp, the data packet in the second direction is scheduled based on the difference obtained by subtracting the duration between the time point at which the data packet in the second direction is received and the time point at which the data packet in the first direction is sent from the total transmission delay requirement, so that a transmission delay of the data packet in the second direction can be further controlled within a small range.

In a possible implementation, after that the first communication device determines a target transmission delay in the second direction, and before that the first communication device sends the data packet in the second direction, the method further includes, if the transmission delay requirement in the second direction of the data packet in the second direction does not meet the target transmission delay in the second direction, the first communication device performs one or more of reducing a transmission delay in a quality of service parameter of the data packet in the second direction, increasing a sending priority of the data packet in the second direction, increasing a service transmission bit rate in the second direction, and increasing a service packet loss rate. In this way, when the transmission delay requirement in the second direction is greater than the target transmission delay in the second direction, if scheduling of the data packet in the second direction is not processed, the transmission delay of the data packet in the second direction may be greater than the target transmission delay in the second direction. Consequently, a total transmission delay may exceed the total transmission delay requirement. In this solution, because one or more of the foregoing measures are taken, an actual transmission delay of the data packet in the second direction can be reduced. In this way, the transmission delay of the data packet in the second direction is not greater than the target transmission delay in the second direction, to ensure that the total transmission delay is not greater than the total transmission delay requirement. In this solution, a quality of service parameter of one service can be adjusted very flexibly. Therefore, compared with a case in a conventional technology, a data packet of each service can be controlled at a finer granularity, and user experience can be further improved.

In a possible implementation, before that the first communication device sends the data packet in the second direction based on a total transmission delay requirement and the time point at which the data packet in the first direction is sent, the method further includes the first communication device obtains the total transmission delay requirement of the service through a session establishment procedure or a session modification procedure. This can implement compatibility with the conventional technology, to obtain the total transmission delay requirement.

According to a second aspect, a data transmission method is provided. The method includes a second communication device determines that a service meets a first condition, and the second communication device triggers a session modification procedure. The session modification procedure is for modifying a quality of service parameter of the service. The first condition includes one or more of a transmission delay in a first direction of the service is greater than a transmission delay requirement in the first direction, where if the first direction is an uplink direction, a second direction is a downlink direction, or if the first direction is a downlink direction, a second direction is an uplink direction, a transmission delay in the second direction of the service is greater than a transmission delay requirement in the second direction, and a total transmission delay of the service is greater than a total transmission delay requirement, where the total transmission delay is a sum of an uplink transmission delay and a downlink transmission delay, and the total transmission delay requirement is a sum of an uplink transmission delay requirement and a downlink transmission delay requirement. In this embodiment of this application, when a transmission delay corresponding to the service does not meet a transmission delay requirement, the QoS parameter may be modified through the triggered session modification procedure. In other words, in this embodiment of this application, a QoS feedback mechanism is introduced, so that the QoS parameter is modified when the transmission delay does not meet the transmission delay requirement.

In a possible implementation, if the first condition is that the total transmission delay is greater than the total transmission delay requirement of the service, before that a second communication device determines that a transmission delay corresponding to a service meets a first condition, the method further includes the second communication device sends a delay detection data packet in the first direction based on a quality of service parameter in the first direction of the service, where the delay detection data packet in the first direction includes a time stamp that indicates a time point at which the delay detection data packet in the first direction is sent, the second communication device receives a delay detection data packet in the second direction, where the delay detection data packet in the second direction is sent based on a quality of service parameter in the second direction of the service, and if the first direction is the uplink direction, the second direction is the downlink direction, or if the first direction is the downlink direction, the second direction is the uplink direction, and the second communication device determines the total transmission delay of the service based on a time point at which the delay detection data packet in the second direction is received and the time point at which the delay detection data packet in the first direction is sent. In this way, the transmission delay of the service can be assessed by sending the delay detection data packet.

In a possible implementation, if the first condition is that the transmission delay in the first direction is greater than the transmission delay requirement in the first direction, before that a second communication device determines that a transmission delay corresponding to a service meets a first condition, the method further includes the second communication device receives a delay detection data packet in the first direction, where the delay detection data packet in the first direction includes a time stamp that indicates a time point at which the delay detection data packet in the first direction is sent, and the second communication device determines the transmission delay in the first direction of the service based on a time point at which the delay detection data packet in the first direction is received and the time point at which the delay detection data packet in the first direction is sent. In this way, whether to perform QoS feedback can be determined based on whether the transmission delay in the first direction meets the transmission delay requirement in the first direction.

In a possible implementation, if the first condition is that the transmission delay in the second direction is greater than the transmission delay requirement in the second direction, before that a second communication device determines that a transmission delay corresponding to a service meets a first condition, the method further includes the second communication device receives a delay detection data packet in the second direction, where the delay detection data packet in the second direction includes a time stamp that indicates a time point at which the delay detection data packet in the second direction is sent, and the second communication device determines the transmission delay in the second direction of the service based on a time point at which the delay detection data packet in the second direction is received and the time point at which the delay detection data packet in the second direction is sent. In this way, whether to perform QoS feedback can be determined based on whether the transmission delay in the second direction meets the transmission delay requirement in the second direction.

In a possible implementation, that the second communication device triggers a session modification procedure includes the second communication device sends first signaling to a session management function network element, where the first signaling is for enabling the session management function network element to send a session modification request. The first signaling includes indication information that indicates an adjusted value of a to-be-adjusted parameter in the quality of service parameter. The to-be-adjusted parameter includes one or more of a quality of service flow identifier, a 5G quality of service identifier, a data packet transmission delay, a service transmission bit rate, and a service packet loss rate. In this way, whether to perform QoS feedback can be determined based on whether the total transmission delay meets the total transmission delay requirement.

In a possible implementation, the second communication device includes a terminal device, a core network element, or a server. This can improve flexibility of the solution.

According to a third aspect, a data transmission method is provided. The method includes a core network element receives a total transmission delay requirement of a service from an application server, and the core network element determines a quality of service parameter corresponding to an uplink data packet of the service and a quality of service parameter corresponding to a downlink data packet of the service based on the total transmission delay requirement of the service. The core network element may decompose an uplink QoS requirement and a downlink QoS requirement based on the total transmission delay requirement of the service, to obtain the quality of service parameter corresponding to the uplink data packet of the service and the quality of service parameter corresponding to the downlink data packet of the service. For some services, for example, the interactive service mentioned in FIG. 1, the server does not care about an uplink transmission delay and a downlink transmission delay, but cares more about a total transmission delay. Therefore, the server only needs to report the total transmission delay requirement required by the server. Then, the core network element decomposes the uplink QoS requirement and the downlink QoS requirement. In this way, assignment between network elements is more reasonable.

In a possible implementation, one of the quality of service parameter corresponding to the uplink data packet and the quality of service parameter corresponding to the downlink data packet includes one or more of a QoS flow identifier, a 5G QoS identifier, a data packet transmission delay, a service transmission bit rate, and a service packet loss rate. In this way, detailed decomposition of QoS requirements may be performed based on the total requirement of the application server.

In a possible implementation, that the core network element determines a quality of service parameter corresponding to an uplink data packet of the service and a quality of service parameter corresponding to a downlink data packet of the service based on the total transmission delay requirement of the service includes the core network element determines an uplink transmission delay requirement and a downlink transmission delay requirement of the service based on the total transmission delay requirement of the service and at least one of a network capability and a network status. In this way, the determined quality of service parameter corresponding to the uplink data packet of the service and the determined quality of service parameter corresponding to the downlink data packet of the service can be more appropriate, and a difference between an actual delay of a data packet and a delay required in a quality of service parameter can be reduced.

In a possible implementation, the network capability includes an uplink bandwidth capability of a network and/or a downlink bandwidth capability of the network. In a possible implementation, the network status includes one or more of a load status of an uplink of an access network, a load status of a downlink of the access network, the uplink transmission delay of an uplink delay detection data packet, and the downlink transmission delay of a downlink delay detection data packet.

In a possible implementation, after that the core network element determines a quality of service parameter corresponding to an uplink data packet of the service and a quality of service parameter corresponding to a downlink data packet of the service based on the total transmission delay requirement of the service, the method further includes the core network element sends, to a session management network element through a session establishment procedure or a session modification procedure, the quality of service parameter corresponding to the uplink data packet of the service and the quality of service parameter corresponding to the downlink data packet of the service. In this way, the session management network element can execute the quality of service parameter corresponding to the uplink data packet and the quality of service parameter corresponding to the downlink data packet, to perform QoS guarantee on the data packet.

According to a fourth aspect, a communication apparatus is provided, to implement the foregoing methods. The communication apparatus may be the first communication device in the first aspect or an apparatus including the first communication device. The first communication device may be a user plane network element or a terminal device. Alternatively, the communication apparatus may be the second communication device in the second aspect or an apparatus including the second communication device. The second communication device may be a terminal device, a core network element, or a server. Alternatively, the communication apparatus may be the core network element in the third aspect or an apparatus including the core network element. The communication apparatus includes a corresponding module, unit, or means for implementing the foregoing methods. The module, unit, or means may be implemented by using hardware or software, or implemented by using hardware by executing corresponding software. The hardware or the software includes one or more modules or units corresponding to the foregoing functions.

According to a fifth aspect, a communication apparatus is provided. The communication apparatus includes a processor and a memory. The memory is configured to store computer instructions. When the processor executes the instructions, the communication apparatus is enabled to perform the method according to any one of the foregoing aspects. The communication apparatus may be the first communication device in the first aspect or an apparatus including the first communication device. The first communication device may be a user plane network element or a terminal device. Alternatively, the communication apparatus may be the second communication device in the second aspect or an apparatus including the second communication device. The second communication device may be a terminal device, a core network element, or a server. Alternatively, the communication apparatus may be the core network element in the third aspect or an apparatus including the core network element.

According to a sixth aspect, a communication apparatus is provided. The communication apparatus includes a processor. The processor is configured to be coupled to a memory and read instructions in the memory, to perform the method according to any one of the foregoing aspects according to the instructions. The communication apparatus may be the first communication device in the first aspect or an apparatus including the first communication device. The first communication device may be a user plane network element or a terminal device. Alternatively, the communication apparatus may be the second communication device in the second aspect or an apparatus including the second communication device. The second communication device may be a terminal device, a core network element, or a server. Alternatively, the communication apparatus may be the core network element in the third aspect or an apparatus including the core network element.

According to a seventh aspect, a computer-readable storage medium is provided. The computer-readable storage medium stores instructions. When the instructions are run on a computer, the computer is enabled to perform the method according to any one of the foregoing aspects.

According to an eighth aspect, a computer program product including instructions is provided. When the computer program product runs on a computer, the computer is enabled to perform the method according to any one of the foregoing aspects.

According to a ninth aspect, a communication apparatus (where for example, the communication apparatus may be a chip or a chip system) is provided. The communication apparatus includes a processor, configured to implement the function in any one of the foregoing aspects. In a possible design, the communication apparatus further includes a memory, and the memory is configured to store necessary program instructions and data. When the communication apparatus is the chip system, the communication apparatus may include a chip, or may include a chip and another discrete component.

For technical effects brought by any design manner of the fourth aspect to the ninth aspect, refer to technical effects brought by different design manners of the first aspect, the second aspect, or the third aspect. Details are not described herein again.

According to a tenth aspect, a communication system is provided. The communication system includes a first communication device and an application server. A first direction is an uplink direction, and a second direction is a downlink direction. The first communication device is configured to receive a data packet in the first direction, receive a data packet in the second direction from the application server, and send the data packet in the second direction based on a total transmission delay requirement and a time point at which the data packet in the first direction is sent. The application server is configured to receive the data packet in the first direction from the first communication device, and send the data packet in the second direction to the first communication device. The data packet in the first direction includes a time stamp that indicates the time point at which the data packet in the first direction is sent, the data packet in the first direction and the data packet in the second direction correspond to a same service, and the total transmission delay requirement is a sum of a transmission delay requirement in the first direction and a transmission delay requirement in the second direction. For technical effects brought by the tenth aspect, refer to technical effects brought by the first aspect. Details are not described herein again.

According to an eleventh aspect, a communication system is provided. The communication system includes a first communication device and an application server. A first direction is a downlink direction, and a second direction is an uplink direction. The first communication device is configured to receive a data packet in the first direction from the application server, receive a data packet in the second direction, and send the data packet in the second direction to the application server based on a total transmission delay requirement and a time point at which the data packet in the first direction is sent. The application server is configured to send the data packet in the first direction to the first communication device, and receive the data packet in the second direction from the first communication device. The data packet in the first direction includes a time stamp that indicates the time point at which the data packet in the first direction is sent, the data packet in the first direction and the data packet in the second direction correspond to a same service, and the total transmission delay requirement is a sum of a transmission delay requirement in the first direction and a transmission delay requirement in the second direction. For technical effects brought by the eleventh aspect, refer to technical effects brought by the first aspect. Details are not described herein again.

According to a twelfth aspect, a communication system is provided. The communication system includes a core network element and an application server. The core network element is configured to receive a total transmission delay requirement of a service from the application server, and determine a quality of service parameter corresponding to an uplink data packet of the service and a quality of service parameter corresponding to a downlink data packet of the service based on the total transmission delay requirement of the service. The application server is configured to send the total transmission delay requirement of the service to the core network element. For technical effects brought by the twelfth aspect, refer to technical effects brought by the third aspect. Details are not described herein again.

DETAILED DESCRIPTION OF ILLUSTRATIVE EMBODIMENTS

The following describes technical solutions in embodiments of this application with reference to the accompanying drawings in embodiments of this application. In the descriptions of this application, unless otherwise specified, "/" indicates an "or" relationship between associated objects. For example, A/B may indicate A or B. In this application, "and/or" describes only an association relationship between associated objects and indicates that three relationships may exist. For example, A and/or B may indicate the following three cases: Only A exists, both A and B exist, and only B exists, where A or B may be singular or plural. In addition, in the descriptions of this application, "a plurality of" means two or more unless otherwise specified. "At least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the technical solutions in embodiments of this application, words such as "first" and "second" are used in embodiments of this application to distinguish between same items or similar items that have basically the same functions or purposes. A person skilled in the art may understand that the words such as "first" and "second" do not limit a quantity or an execution sequence, and the words such as "first" and "second" do not indicate a definite difference. In addition, in embodiments of this application, the word such as "example" or "for example" is used to represent giving an example, an illustration, or a description. Any embodiment or design scheme described as an "example" or "for example" in embodiments in this application should not be explained as being more preferable or having more advantages than another embodiment or design scheme. Exactly, use of the word such as "example" or "for example" is intended to present a relative concept in a specific manner for ease of understanding.

In addition, a network architecture and a service scenario described in embodiments of this application are intended to describe the technical solutions in embodiments of this application more clearly, and do not constitute a limitation on the technical solutions provided in embodiments of this application. A person of ordinary skill in the art may know that, with evolution of the network architecture and emergence of a new service scenario, the technical solutions provided in embodiments of this application are also applicable to similar technical problems.

Figure 2:
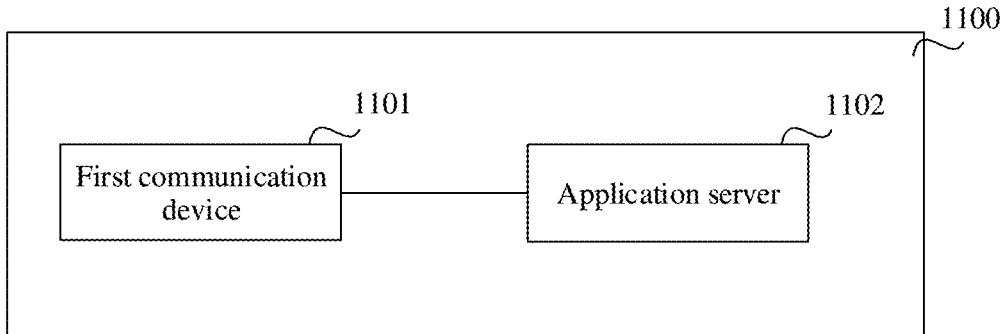
FIG. 2 is a schematic diagram of a structure of a communication system according to an embodiment of this application.

FIG. 2 is an example of a schematic diagram of an architecture of a communication system according to an embodiment of this application. As shown in FIG. 2, the communication system 1100 includes a first communication device 1101 and an application server 1102. The first communication device 1101 and the application server 1102 may directly communicate with each other, or may communicate with each other through forwarding by another device. This is not specifically limited in this embodiment of this application.

Based on the system architecture of the communication system 1100, this embodiment of this application may provide two possible implementations.

In the first possible implementation, a first direction is an uplink direction, and a second direction is a downlink direction. The first communication device 1101 is configured to receive a data packet in the first direction, receive a data packet in the second direction from the application server 1102, and send the data packet in the second direction based on a total transmission delay requirement and a time point at which the data packet in the first direction is sent. The application server 1102 is configured to receive the data packet in the first direction from the first communication device 1101, and send the data packet in the second direction to the first communication device 1101. The data packet in the first direction includes a time stamp that indicates the time point at which the data packet in the first direction is sent, the data packet in the first direction and the data packet in the second direction correspond to a same service, and the total transmission delay requirement is a sum of a transmission delay requirement in the first direction and a transmission delay requirement in the second direction.

In the second possible implementation, a first direction is a downlink direction, and a second direction is an uplink direction. The first communication device 1101 is configured to receive a data packet in the first direction from the application server 1102, receive a data packet in the second direction, and send the data packet in the second direction to the application server 1102 based on a total transmission delay requirement and a time point at which the data packet in the first direction is sent. The application server 1102 is configured to send the data packet in the first direction to the first communication device 1101, and receive the data packet in the second direction from the first communication device 1101. The data packet in the first direction includes a time stamp that indicates the time point at which the data packet in the first direction is sent, the data packet in the first direction and the data packet in the second direction correspond to a same service, and the total transmission delay requirement is a sum of a transmission delay requirement in the first direction and a transmission delay requirement in the second direction.

In the foregoing two possible implementations, because the data packet in the second direction may be scheduled based on the total transmission delay requirement and the sending time in the first direction of the service, delay control may be performed on the data packet in the second direction used as a finer granularity.

Figure 3:
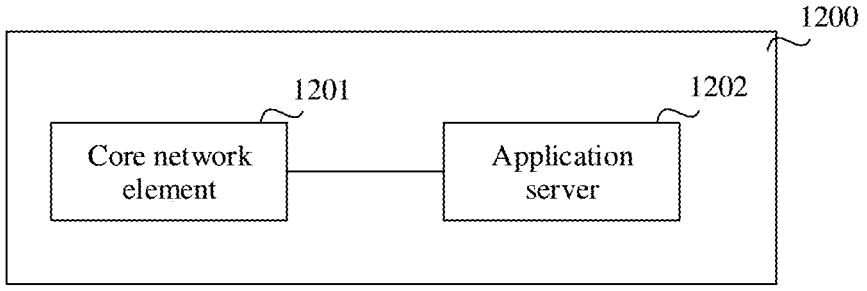
FIG. 3 is a schematic diagram of a structure of another communication system according to an embodiment of this application.

FIG. 3 is an example of a schematic diagram of an architecture of a communication system according to an embodiment of this application. As shown in FIG. 3, the communication system 1200 includes a core network element 1201 and an application server 1202. The core network element 1201 and the application server 1202 may directly communicate with each other, or may communicate with each other through forwarding by another device. This is not specifically limited in this embodiment of this application.

The core network element 1201 is configured to receive a total transmission delay requirement of a service from the application server 1202, and determine a quality of service parameter corresponding to an uplink data packet of the service and a quality of service parameter corresponding to a downlink data packet of the service based on the total transmission delay requirement of the service. The application server 1202 is configured to send the total transmission delay requirement of the service to the core network element 1201. In this way, for some services, for example, the interactive service mentioned in FIG. 1, the server does not care about an uplink transmission delay and a downlink transmission delay, but cares more about a total transmission delay. Therefore, the server only needs to report the total transmission delay requirement required by the server. Then, the core network element decomposes an uplink QoS requirement and a downlink QoS requirement. In this way, assignment between network elements is more reasonable.

Optionally, the communication system 1100 shown in FIG. 2 or the communication system 1200 shown in FIG. 3 may be used in a currently discussed 5G network, another future network, or the like. This is not specifically limited in embodiments of this application.

Figure 4:
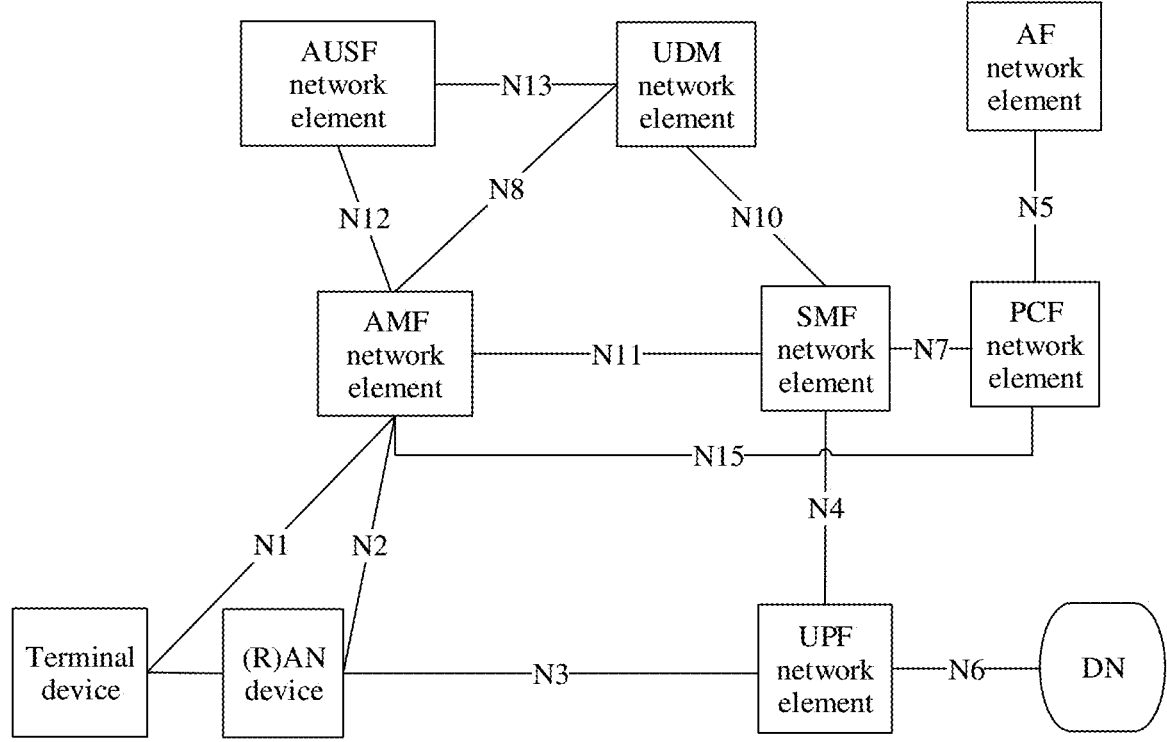
FIG. 4 shows a 5G network architecture in a non-roaming scenario according to an embodiment of this application.

For example, assuming that the communication system 1100 shown in FIG. 2 or the communication system 1200 shown in FIG. 3 is used in a 5G network architecture in a non-roaming scenario, as shown in FIG. 4, the first communication device may be a user plane network element or a terminal device. The user plane network element is a user plane function (UPF) network element in the non-roaming 5G network architecture. The core network element in this embodiment of this application may include any one of a network exposure function network element, an access and mobility management network element, and a session management network element. The network exposure function network element may be a network exposure function (NEF) network element in the non-roaming 5G network architecture. The access and mobility management network element may be an access and mobility management function (AMF) network element in the non-roaming 5G network architecture. The session management network element may be a session management function (SMF) network element in the non-roaming 5G network architecture. Alternatively, the core network element may be another network element located in a core network in the non-roaming 5G network architecture.

In addition, as shown in FIG. 4, the non-roaming 5G network architecture may further include a (radio) access network ((R)AN) device and a data network (DN), a policy control network element (where the policy control network element may be a policy control function (PCF) network element), an authentication server function (AUSF) network element, a unified data management (UDM) network element, an application function (AF) network element, or some other network elements that are not shown, for example, a network repository function (NRF) network element. This is not specifically limited in this embodiment of this application.

The terminal device communicates with the AMF network element through a next generation (N) 1 interface (N1 for short). The RAN device communicates with the AMF network element through an N2 interface (N2 for short), and the RAN device communicates with the UPF network element through an N3 interface (N3 for short). The UPF network element communicates with the DN through an N6 interface (N6 for short). The AMF network element communicates with the SMF network element through an M1 interface (N11 for short), the AMF network element communicates with the UDM network element through an N8 interface (N8 for short), the AMF network element communicates with the AUSF network element through an N12 interface (N12 for short), and the AMF network element communicates with the PCF network element through an N15 interface (N15 for short). The SMF network element communicates with the PCF network element through an N7 interface (N7 for short), the SMF network element communicates with the UPF network element through an N4 interface (N4 for short), and the SMF network element communicates with the UDM network element through an N10 interface (N10 for short). The UDM network element communicates with the AUSF network element through an N13 interface (N13 for short). The PCF network element communicates with the AF network element through an N5 interface (N5 for short).

Figure 5:
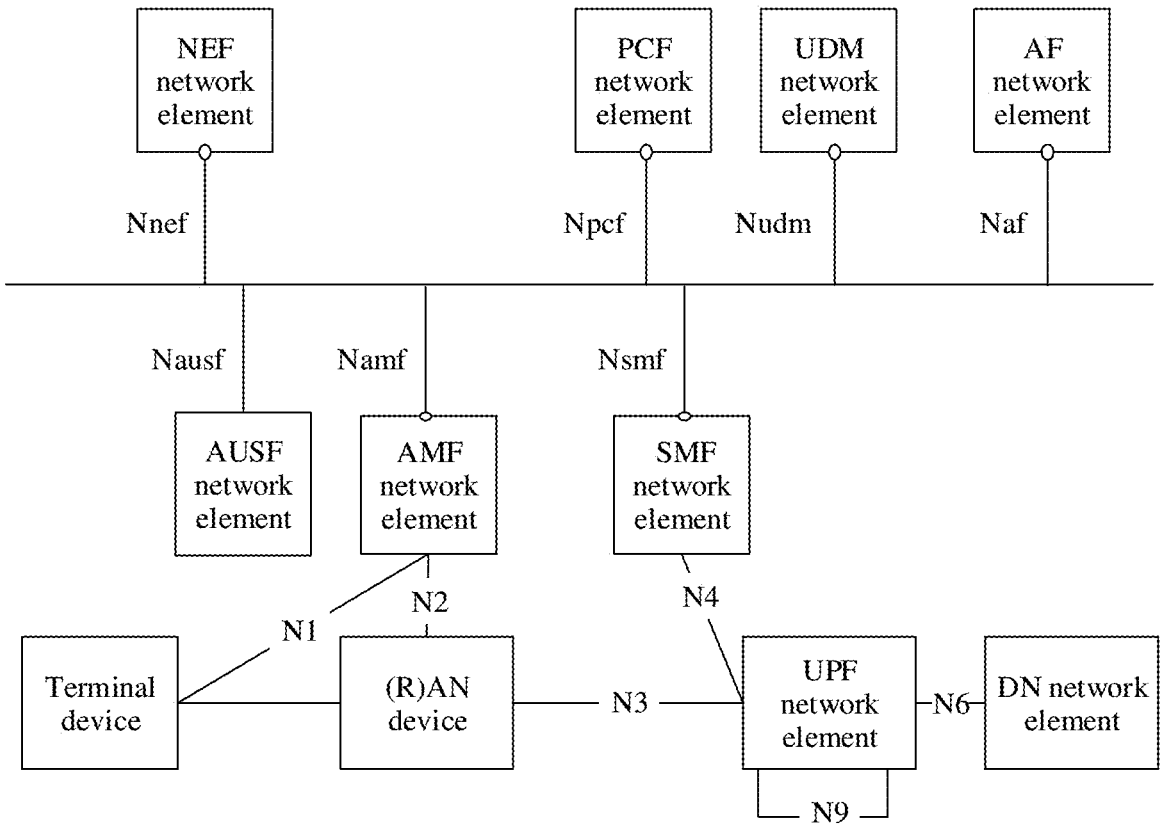
FIG. 5 shows another 5G network architecture in a non-roaming scenario according to an embodiment of this application.

In addition, it should be noted that control plane network elements such as the AMF network element, the SMF network element, the UDM network element, the AUSF network element, the PCF network element, and the AF network element in the non-roaming 5G network architecture shown in FIG. 4 may alternatively interact with each other through service-oriented interfaces. For example, as shown in FIG. 5, an external service-oriented interface provided by the AMF network element may be Namf, an external service-oriented interface provided by the SMF network element may be Nsmf, an external service-oriented interface provided by the UDM network element may be Nudm, an external service-oriented interface provided by the PCF network element may be Npcf, an external service-oriented interface provided by the AUSF network element may be Nausf, and an external service-oriented interface provided by the AF network element may be Naf. For related descriptions, refer to a 5G system architecture (5G system architecture) in the standard 23501. Details are not described herein.

Certainly, the communication system 1100 shown in FIG. 2 or the communication system 1200 shown in FIG. 3 may also be used in a 5G network architecture in a local breakout roaming scenario or a 5G network architecture in a home routed roaming scenario. In this case, only adaptive replacement needs to be performed on related network elements, and details are not described herein.

Optionally, the terminal device in embodiments of this application may be a device configured to implement a wireless communication function, for example, a terminal or a chip that may be used in the terminal. The terminal may be user equipment (UE), an access terminal, a terminal unit, a terminal station, a mobile station, a remote station, a remote terminal, a mobile device, a wireless communication device, a terminal agent, a terminal apparatus, or the like in a 5G network or a future evolved PLMN. The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a virtual reality (VR) terminal device, an augmented reality (AR) terminal device, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or at a fixed location.

Optionally, the RAN device in embodiments of this application is a device that accesses a core network. For example, the RAN device may be a base station, a broadband network gateway (BNG), an aggregation switch, or a non-3rd generation partnership project (3GPP) access device. There may be various forms of base stations, for example, a macro base station, a micro base station (also referred to as a small cell), a relay station, and an access point.

Optionally, the first communication device, the second communication device, the core network element, or the application server in embodiments of this application may also be referred to as a communication apparatus, and may be a general-purpose device or a dedicated device. This is not specifically limited in embodiments of this application.

Optionally, a related function of the first communication device, the second communication device, the core network element, or the application server in embodiments of this application may be implemented by one device, may be jointly implemented by a plurality of devices, or may be implemented by one or more functional modules in one device. This is not specifically limited in embodiments of this application. It may be understood that the foregoing function may be a network element in a hardware device, may be a software function running on dedicated hardware, a combination of hardware and software, or a virtualization function instantiated on a platform (for example, a cloud platform).

Figure 6:
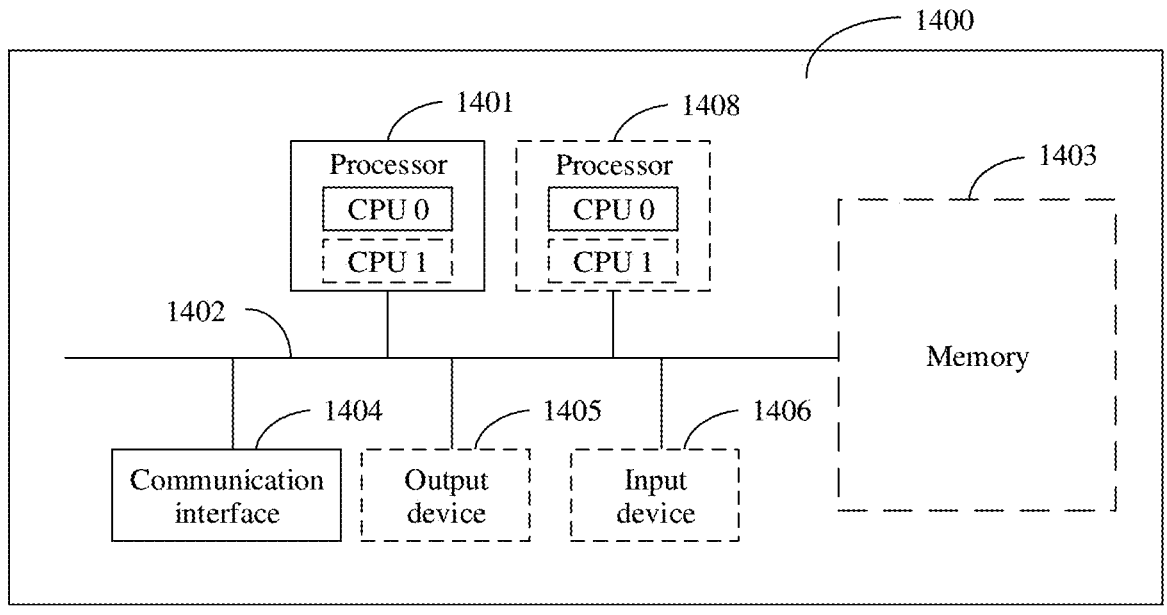
FIG. 6 is a schematic diagram of a structure of a communication apparatus according to an embodiment of this application.

For example, a related function of the first communication device, the second communication device, the core network element, or the application server in embodiments of this application may be implemented by using a communication device 1400 in FIG. 6. FIG. 6 is a schematic diagram of a structure of the communication device 1400 according to an embodiment of this application. The communication device 1400 includes one or more processors 1401, a communication line 1402, and at least one communication interface (in FIG. 6, only an example in which a communication interface 1404 and one processor 1401 are included is used for description), and optionally, may further include a memory 1403.

The processor 1401 may be a general-purpose central processing unit (CPU), a microprocessor, an application-specific integrated circuit (ASIC), or one or more integrated circuits for controlling program execution of the solutions of this application.

The communication line 1402 may include a path for connecting different components.

The communication interface 1404 may be a transceiver module, configured to communicate with another device or a communication network, for example, the Ethernet, a RAN, or a wireless local area network (WLAN). For example, the transceiver module may be an apparatus such as a transceiver or a transceiver. Optionally, the communication interface 1404 may alternatively be a transceiver circuit located in the processor 1401, and is configured to implement signal input and signal output of the processor.

The memory 1403 may be an apparatus having a storage function. For example, the memory 1403 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, and the like), a magnetic disk storage medium or another magnetic storage device, or any other medium that can be used to carry or store expected program code in a form of instructions or a data structure and that can be accessed by a computer, but is not limited thereto. The memory may exist independently, and is connected to the processor through the communication line 1402. Alternatively, the memory may be integrated with the processor.

The memory 1403 is configured to store computer-executable instructions for executing the solutions in this application, and the processor 1401 controls execution. The processor 1401 is configured to execute the computer-executable instructions stored in the memory 1403, to implement the data transmission methods provided in embodiments of this application.

Alternatively, optionally, in this embodiment of this application, the processor 1401 may implement a processing-related function in the data transmission methods provided in the following embodiments of this application, and the communication interface 1404 is responsible for communicating with another device or a communication network. This is not specifically limited in this embodiment of this application.

Optionally, the computer-executable instructions in this embodiment of this application may also be referred to as application program code. This is not specifically limited in this embodiment of this application.

During specific implementation, in an embodiment, the processor 1401 may include one or more CPUs, for example, a CPU 0 and a CPU 1 in FIG. 6.

During specific implementation, in an embodiment, the communication device 1400 may include a plurality of processors, for example, the processor 1401 and a processor 1408 in FIG. 6. Each of the processors may be a single-core processor or a multi-core (multi-core) processor. The processor herein may include but is not limited to various computing devices that run software, such as, a central processing unit (CPU), a microprocessor, a digital signal processor (DSP), a microcontroller unit (MCU), an artificial intelligence processor, or the like. Each computing device may include one or more cores configured to perform an operation or processing by executing software instructions.

During specific implementation, in an embodiment, the communication device 1400 may further include an output device 1405 and an input device 1406. The output device

1405 communicates with the processor 1401, and may display information in a plurality of manners. For example, the output device 1405 may be a liquid crystal display (LCD), a light emitting diode (LED) display device, a cathode ray tube (CRT) display device, or a projector. The input device 1406 communicates with the processor 1401, and may receive an input of a user in a plurality of manners. For example, the input device 1406 may be a mouse, a keyboard, a touchscreen device, or a sensing device.

The communication device 1400 may also be referred to as a communication apparatus sometimes, and may be a general-purpose device or a dedicated device. For example, the communication device 1400 may be a desktop computer, a portable computer, a network server, a personal digital assistant (PDA), a mobile phone, a tablet computer, a wireless terminal device, an embedded device, the foregoing terminal device, the foregoing network device, or a device having a structure similar to the structure shown in FIG. 6. A type of the communication device 1400 is not limited in this embodiment of this application.

The following describes the data transmission methods provided in embodiments of this application in detail with reference to FIG. 1 to FIG. 6.

It should be noted that names of messages between network elements, names of parameters in the messages, or the like in the following embodiments of this application are merely examples, and there may alternatively be other names during specific implementation. This is not specifically limited in embodiments of this application.

Figure 7:
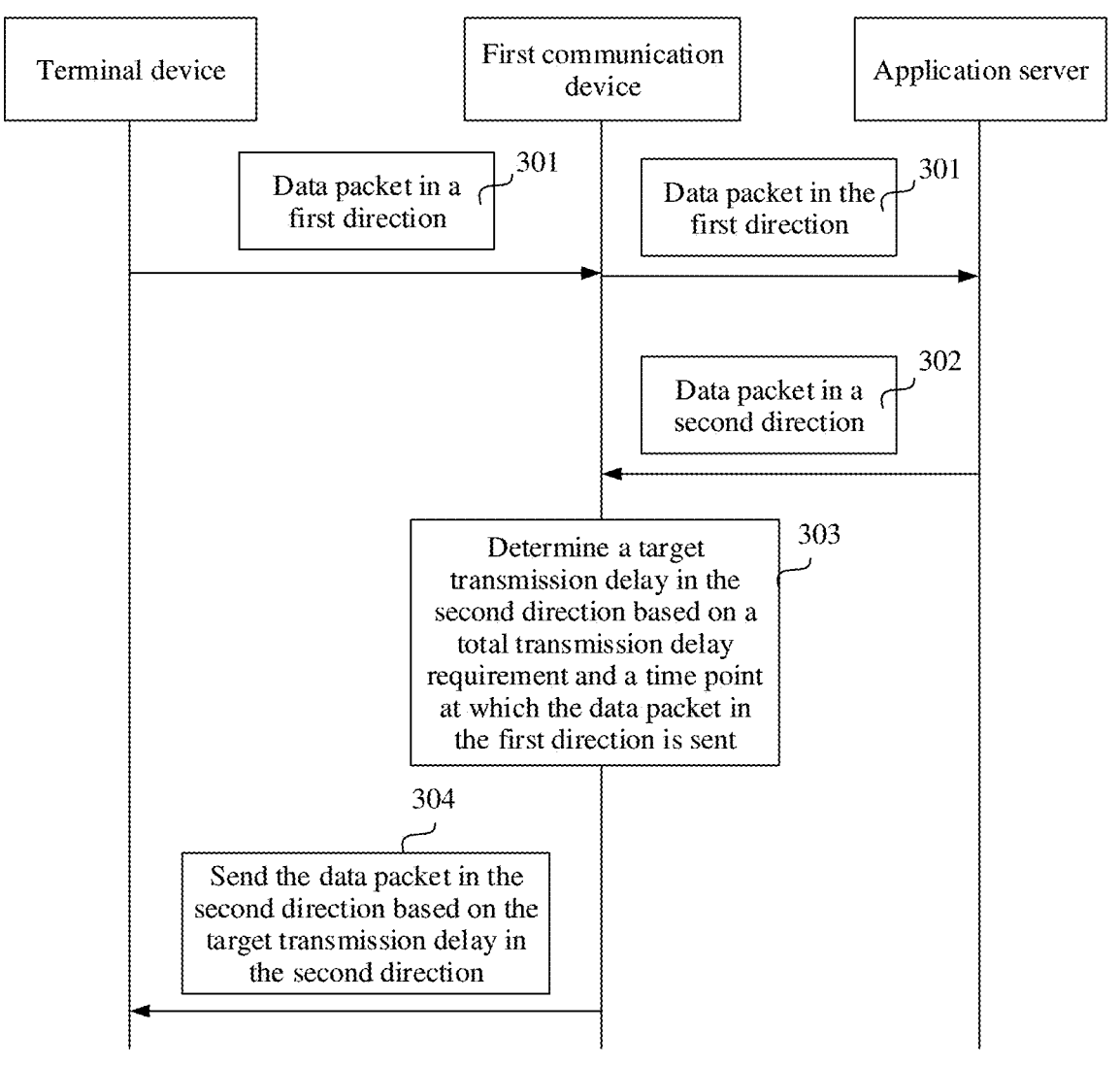
FIG. 7 is a schematic flowchart of a data transmission method according to an embodiment of this application.

An example in which the communication system shown in FIG. 2 is used in the 5G network architecture in the non-roaming scenario shown in FIG. 4 or FIG. 5 is used. FIG. 7 shows a data transmission method according to an embodiment of this application. In FIG. 7, an example in which a first direction is an uplink direction and a second direction is a downlink direction is used. In FIG. 7, an example in which a first communication device is a network element (where for example, the network element may be a user plane network element) is used for description. In another possible implementation, the first communication device may alternatively be a terminal device. The data transmission method includes the following steps.

Step 301: The first communication device obtains a data packet in the first direction, where the data packet in the first direction includes a time stamp that indicates a time point at which the data packet in the first direction is sent.

Further, as shown in FIG. 7, when the first direction is the uplink direction, after receiving the data packet in the first direction sent by the terminal device, the first communication device may send the data packet in the first direction to an application server.

Step 302: The first communication device obtains a data packet in the second direction, where the data packet in the first direction and the data packet in the second direction correspond to a same service.

Figure 1:
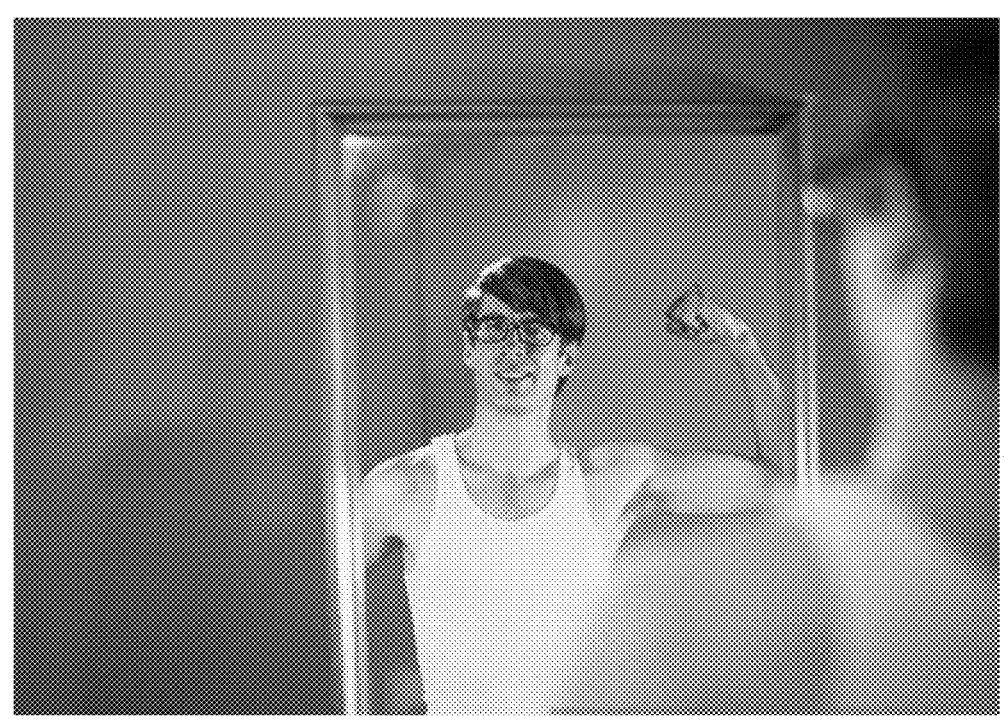
FIG. 1 is a scenario diagram of an interactive service.

In this embodiment of this application, a same service may correspond to a plurality of data packets, for example, one or more uplink data packets and one or more downlink data packets. For example, a data flow of the same service in this embodiment of this application may be used in the following scenarios. For example, the terminal device may send uplink data to the server, and downlink data is a response to the uplink data. In this case, the uplink data and the downlink data may belong to the data flow of the same service. For another example, the server may send downlink data to the terminal device, and uplink data is a response to the downlink data. In this case, the downlink data and the uplink data may belong to the data flow of the same service. In this embodiment of this application, that the data packet in the first direction and the data packet in the second direction correspond to a same service means that the data packet in the second direction is generated based on the data packet in the first direction. For example, the downlink data corresponding to the "hand-raising action" mentioned in FIG. 1 is generated based on the uplink data corresponding to the "hand-raising action", and the downlink data corresponding to the "hand-raising action" and the uplink data corresponding to the "hand-raising action" mentioned in FIG. 1 may correspond to a same service. For another example, if the data packet in the first direction is request signaling for requesting some data, the data packet in the second direction that is generated based on the data packet in the first direction may carry the requested data. In this case, the data packet in the first direction and the data packet in the second direction correspond to the same service.

Step 303: The first communication device determines a target transmission delay in the second direction based on a total transmission delay requirement and the time point at which the data packet in the first direction is sent. The total transmission delay requirement is a sum of a transmission delay requirement in the first direction and a transmission delay requirement in the second direction.

Step 304: The first communication device sends the data packet in the second direction based on the target transmission delay in the second direction.

It can be learned from the foregoing solution that, in this embodiment of this application, the data packet in the second direction may be scheduled based on the total transmission delay requirement and a transmission delay in the first direction of the service. In other words, in this embodiment of this application, delay control may be performed on the data packet in the second direction used as a finer granularity. However, in an existing solution, coarse-grained QoS control is performed only on all data in an uplink service flow and all data in a downlink service flow of a service. With reference to FIG. 1, in the existing solution, coarse-grained QoS control is performed only on all data in an uplink service flow and all data in a downlink service flow of a VR service, but QoS control cannot be separately performed on a data packet used as a finer granularity in the VR service. For example, the uplink data corresponding to the "hand-raising action" and the downlink data corresponding to the "hand-raising action" in FIG. 1 cannot be scheduled. However, after the solution provided in this embodiment of this application is applied to FIG. 1, a transmission delay of the uplink data corresponding to the "hand-raising action" may be obtained, and the downlink data corresponding to the "hand-raising action" is scheduled based on a total transmission delay requirement of the VR service, so that the downlink data corresponding to the "hand-raising action" can meet a delay requirement.

In FIG. 7, only the example in which the first direction is the uplink direction and the second direction is the downlink direction is used. In another possible implementation, if a first direction is a downlink direction and a second direction is an uplink direction, in FIG. 7, the first communication device may receive a data packet in the first direction from the application server, send the data packet in the first direction to the terminal device, receive a data packet in the second direction from the terminal device, and send the data packet in the second direction to the application server based on a total transmission delay requirement and a time point at which the data packet in the first direction is sent.

In FIG. 7, the first communication device is merely used as an example. In another possible implementation, if the first communication device is the terminal device, a first direction is a downlink direction, and a second direction is an uplink direction. In this implementation, the first communication device receives a data packet in the first direction from the application server, and sends a generated data packet in the second direction to the application server based on a total transmission delay requirement and a time point at which the data packet in the first direction is sent.

There are a plurality of implementations in which the data packet in the first direction and the data packet in the second direction correspond to the same service in step 302. In a possible implementation, the first communication device obtains a group identifier of the data packet in the first direction. If the first communication device determines that a group identifier of the data packet in the second direction has an association relationship with the group identifier of the data packet in the first direction, the first communication device determines that the data packet in the first direction and the data packet in the second direction correspond to the same service. The data packet in the first direction includes the group identifier, and the data packet in the second direction includes the group identifier.

In this embodiment of this application, that two group identifiers have an association relationship may be determined based on features of the group identifiers, may be calculated based on a preset operation formula, or may be determined by querying a group identifier correspondence table. The group identifier correspondence table includes some group identifiers that have an association relationship. The following separately describes several possible implementations by using a solution a1, a solution a2, a solution a3, and a solution a4.

Solution a1: That a group identifier of the data packet in the second direction has an association relationship with the group identifier of the data packet in the first direction includes the group identifier of the data packet in the second direction is the same as the group identifier of the data packet in the first direction.

Solution a2: That a group identifier of the data packet in the second direction has an association relationship with the group identifier of the data packet in the first direction includes a preset field in the group identifier of the data packet in the second direction is the same as a preset field in the group identifier of the data packet in the first direction. For example, the preset field may be a part of fields in the group identifier or the first three characters in the group identifier.

Solution a3: That a group identifier of the data packet in the second direction has an association relationship with the group identifier of the data packet in the first direction includes the group identifier of the data packet in the first direction is used as an input, and a preset operation formula is run. If an output value is the same as the group identifier of the data packet in the second direction, it is determined that the group identifier of the data packet in the second direction has the association relationship with the group identifier of the data packet in the first direction.

Solution a4: That a group identifier of the data packet in the second direction has an association relationship with the group identifier of the data packet in the first direction includes a group identifier correspondence table is queried. If a group identifier that is in the group identifier correspondence table and that corresponds to the group identifier of the data packet in the first direction is the same as the group identifier of the data packet in the second direction, it is determined that the group identifier of the data packet in the second direction has the association relationship with the group identifier of the data packet in the first direction.

Positions of the group identifier carried in the data packet in the first direction and the group identifier carried in the data packet in the second direction have a plurality of implementations. This embodiment of this application provides several possible implementations.

Figure 8:
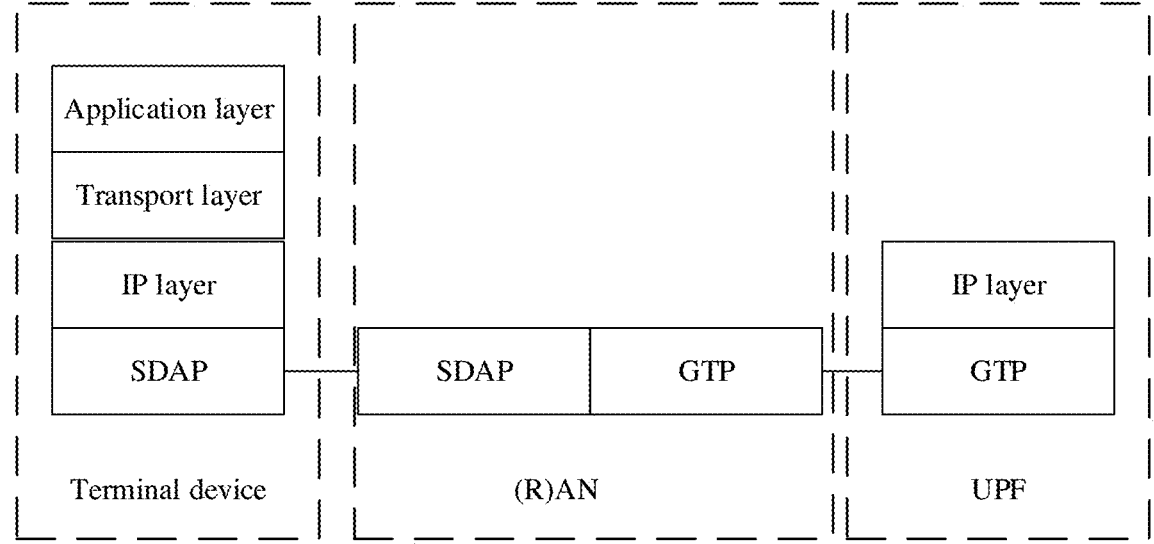
FIG. 8 is a schematic diagram of a network architecture.

FIG. 8 is an example of a schematic diagram of a network architecture. FIG. 8 shows an application layer, a transport layer, an internet protocol (IP) layer, and a service data adaptation protocol (SDAP) layer on a terminal device side. FIG. 8 further shows an SDAP layer and a general packet radio service tunneling protocol (GTP) layer on a RAN side, and a GTP layer and an IP layer on a UPF side.

For an uplink data packet, the terminal device generates the uplink data packet, and sends the uplink data packet to the UPF through the RAN. In an example, for the uplink data packet, the terminal device side adds a group identifier to the uplink data packet at the application layer. At the IP layer, the terminal device writes the group identifier that is of the uplink data packet and that is read from the application layer into the IP layer, for example, an option of the IP layer. Further, at the SDAP layer, the terminal device writes the group identifier that is of the uplink data packet and that is read from the IP layer into a header of the SDAP layer. Further, optionally, the terminal device may add a time stamp to the uplink data packet of an interactive service, for example, add the time stamp to the SDAP layer of the uplink data packet, where the time stamp indicates a time point at which the uplink data packet is sent. The terminal device sends the uplink data packet to the RAN. The RAN may read the group identifier from the SDAP layer, and write the group identifier into the GTP layer of the uplink data packet. The RAN sends the uplink data packet to the UPF. After receiving the uplink data packet, the UPF may obtain the group identifier of the uplink data packet from the GTP layer. After receiving the uplink data packet, the server may obtain the group identifier of the uplink data packet from the GTP layer.

In another example, for the uplink data packet, the terminal device side adds a group identifier to the uplink data packet at the application layer. At the IP layer, the terminal device writes the group identifier that is of the uplink data packet and that is read from the application layer into the IP layer, for example, an option of the IP layer. The terminal device sends the uplink data packet to the UPF through the RAN. After receiving the uplink data packet, the UPF may obtain the group identifier of the uplink data packet from the IP layer. After receiving the uplink data packet, the server may obtain the group identifier of the uplink data packet from the IP layer.

In a third example, for a downlink data packet, after receiving an uplink data packet, when generating the downlink data packet based on the uplink data packet, the server reads a group identifier of the uplink data packet, and adds, to the downlink data packet, a group identifier that has an association relationship with the group identifier. For example, the group identifier included in the downlink data packet may be carried at the IP layer of the downlink data packet. The server sends the downlink data packet to the UPF. After receiving the downlink data packet, the UPF may read, from the IP layer (for example, an option of the IP layer), the group identifier carried in the downlink data packet. After receiving the downlink data packet, the terminal device may read, from the IP layer (for example, an option of the IP layer), the group identifier carried in the downlink data packet.

For step 303, in a possible implementation of step 303, that the first communication device determines a target transmission delay in the second direction based on a total transmission delay requirement and the time point at which the data packet in the first direction is sent includes the first communication device determines the transmission delay in the first direction based on a time point at which the data packet in the first direction is received and the time stamp in the data packet in the first direction. The first communication device determines the target transmission delay in the second direction based on a difference between the total transmission delay requirement and the transmission delay in the first direction. For example, when the first communication device is the server, the transmission delay in the first direction may be a transmission delay between the terminal device and the application server. When the first communication device is the user plane network element, the transmission delay in the first direction may be a transmission delay between the terminal device and the user plane network element. When the first communication device is the terminal device, the transmission delay in the first direction may be a transmission delay between the terminal device and the application server or a transmission delay between the terminal device and the user plane network element. The example shown in FIG. 8 is used for description. As shown in FIG. 8, using an example in which the first communication device is the UPF, after receiving the uplink data packet, the UPF may record a time point at which the uplink data packet arrives, calculate an uplink transmission delay of the uplink data packet based on the time stamp in the uplink data packet, and use a difference between a total transmission delay requirement and the uplink transmission delay as a target transmission delay of the downlink data packet.

For step 303, in another possible implementation of step 303, that the first communication device determines a target transmission delay in the second direction based on a total transmission delay requirement and the time point at which the data packet in the first direction is sent includes the first communication device determines duration between a time point at which the data packet in the second direction is received and the time stamp. The first communication device determines the target transmission delay in the second direction based on a difference between the total transmission delay requirement and the duration. The example shown in FIG. 8 is used for description. As shown in FIG. 8, using an example in which the first communication device is the UPF, the UPF receives the uplink data packet and the downlink data packet, records a time point at which the received downlink data packet arrives when the downlink data packet is received, calculates duration between the time stamp in the uplink data packet and the time point at which the downlink data packet arrives at the UPF, and uses a difference between a total transmission delay requirement and the duration as a target transmission delay.

In step 304, a transmission delay of the data packet in the second direction may meet the target transmission delay in the second direction as much as possible. For example, the transmission delay of the data packet in the second direction is not greater than the target transmission delay in the second direction. For example, if a total transmission delay requirement is 20 ms, when a transmission delay of an uplink data packet is 5 ms, when the UPF receives a downlink data packet, the UPF needs to control a transmission delay of the downlink data packet to be not greater than 15 ms. A target downlink transmission delay may be 15 ms. In this way, compared with a solution that is in a conventional technology and in which a data packet in a second direction is sent only based on a quality of service parameter in a QoS flow, this solution can schedule sending of the data packet in the second direction more flexibly, more accurately, and at a finer granularity.

In this embodiment of this application, a network may perform QoS guarantee on a transmitted service through a QoS flow mechanism. Specifically, a QoS flow may be established between the terminal device and the user plane network element, and services with same QoS may be transmitted through a same QoS flow. For example, a QoS flow 1 and a QoS flow 2 may be established, so that data corresponding to two types of QoS is respectively transmitted through the QoS flow 1 and the QoS flow 2. In this embodiment of this application, the QoS flow correspondingly includes a plurality of QoS parameters. Table 1 is an example of a schematic table of some QoS parameters. As shown in table 1, the quality of service parameter may include a 5G QoS identifier (5QI), a transmission delay, a packet error rate, a priority level (Default Priority Level), and the like. A person skilled in the art may know that there are many other QoS parameters, for example, a service transmission bit rate and a service packet loss rate though they are not shown in table 1. The 5QI is a scalar to be indexed to a corresponding 5G QoS characteristic. The 5QI is classified into a standardized 5QI, a preconfigured 5QI, and a dynamically allocated 5QI. The standardized 5QIs are in a one-to-one correspondence with a group of standardized 5G QoS characteristic values. A 5G QoS characteristic value corresponding to the preconfigured 5QI is preconfigured on the RAN device. A 5G QoS characteristic corresponding to the dynamically allocated 5QI is sent by a core network device to the RAN device by using a QoS profile. The priority level indicates a priority in scheduling resources among QoS flows.

TABLE 1

| | | | | | Default maximum data burst transmission volume (NOTE 2) | Default averaging transmission window | |
|---|---|---|---|---|---|---|---|
| 5QI value | Resource type | Priority level | Transmission delay | Packet error rate | | | Example services |
| 1 | Guaranteed bit rate (GBR) | 20 | 100 ms (NOTE 11, NOTE 13) | $10^{-2}$ | N/A | 2000 ms | Conversational voice |
| 2 | (NOTE 1) | 40 | 150 ms (NOTE 11, NOTE 13) | $10^{-3}$ | N/A | 2000 ms | Conversational video (Live Streaming) |

Schematic table of the quality of service parameter

TABLE 1-continued

| | | | | | Default maximum data burst | Default averaging | |
| 5QI value | Resource type | Priority level | Transmission delay | Packet error rate | transmission volume (NOTE 2) | transmission window | Example services |
| --- | --- | --- | --- | --- | --- | --- | --- |
| 3 (NOTE 14) | | 30 | 50 ms (NOTE 11, NOTE 13) | $10^{-3}$ | N/A | 2000 ms | Real time gaming, vehicle-to-everything messages (V2X messages), and process automation-monitoring |

For step 304, in a possible implementation of step 304, if the transmission delay requirement in the second direction of the data packet in the second direction does not meet the target transmission delay in the second direction, before the data packet in the second direction is sent, a quality of service parameter of the data packet in the second direction may be adjusted, and then the data packet in the second direction is sent based on an adjusted quality of service parameter.

The adjustment of the quality of service parameter in this embodiment of this application may include adjustment of one or more of a QoS flow identifier (QFI), a 5QI, a data packet transmission delay, a service transmission bit rate, and a service packet loss rate of the service. When the transmission delay requirement in the second direction of the data packet in the second direction does not meet the target transmission delay in the second direction, the quality of service parameter needs to be adjusted, so that a transmission speed of the data packet in the second direction is increased. Optionally, one or more of the following content may be performed for the data packet in the second direction: reducing a transmission delay in the quality of service parameter of the data packet in the second direction, increasing a sending priority of the data packet in the second direction, increasing a service transmission bit rate in the second direction, and increasing a service packet loss rate.

In an optional implementation, if a delay parameter is adjusted, a reduced transmission delay in the quality of service parameter of the data packet in the second direction meets the target transmission delay in the second direction as much as possible. For example, the reduced transmission delay in the quality of service parameter of the data packet in the second direction is not greater than the target transmission delay in the second direction. In this way, compared with the solution that is in the conventional technology and in which the data packet in the second direction is sent only based on the quality of service parameter in the QoS flow, this solution can modify the quality of service parameter, to control sending of the data packet in the second direction at a finer granularity.

In another optional implementation, if a priority is adjusted, and the priority may include the QFI and/or the 5QI, an increased priority of the data packet in the second direction meets the target transmission delay in the second direction as much as possible. For example, the data packet in the second direction is sent based on the increased priority of the data packet in the second direction. In this case, the transmission delay in the second direction of the data packet in the second direction is not greater than the target transmission delay in the second direction. In this way, compared with the solution that is in the conventional technology and in which the data packet in the second direction is sent only based on the quality of service parameter in the QoS flow, this solution can modify the priority, to control sending of the data packet in the second direction at a finer granularity.

Before step 303, the method further includes the first communication device obtains the total transmission delay requirement. The total transmission delay requirement may be obtained in a plurality of implementations. For example, the total transmission delay requirement of the service may be obtained through a session establishment procedure, a session modification procedure, and a public data network (PDN) connection procedure. The following uses an example in which the session establishment procedure is a packet data unit (PDU) session establishment procedure and the session modification procedure is a PDU session modification procedure for description. In this embodiment of this application, a PDU session may be an association between the terminal device and a data network (DN), and is for providing a PDU connection service.

Figure 9A:
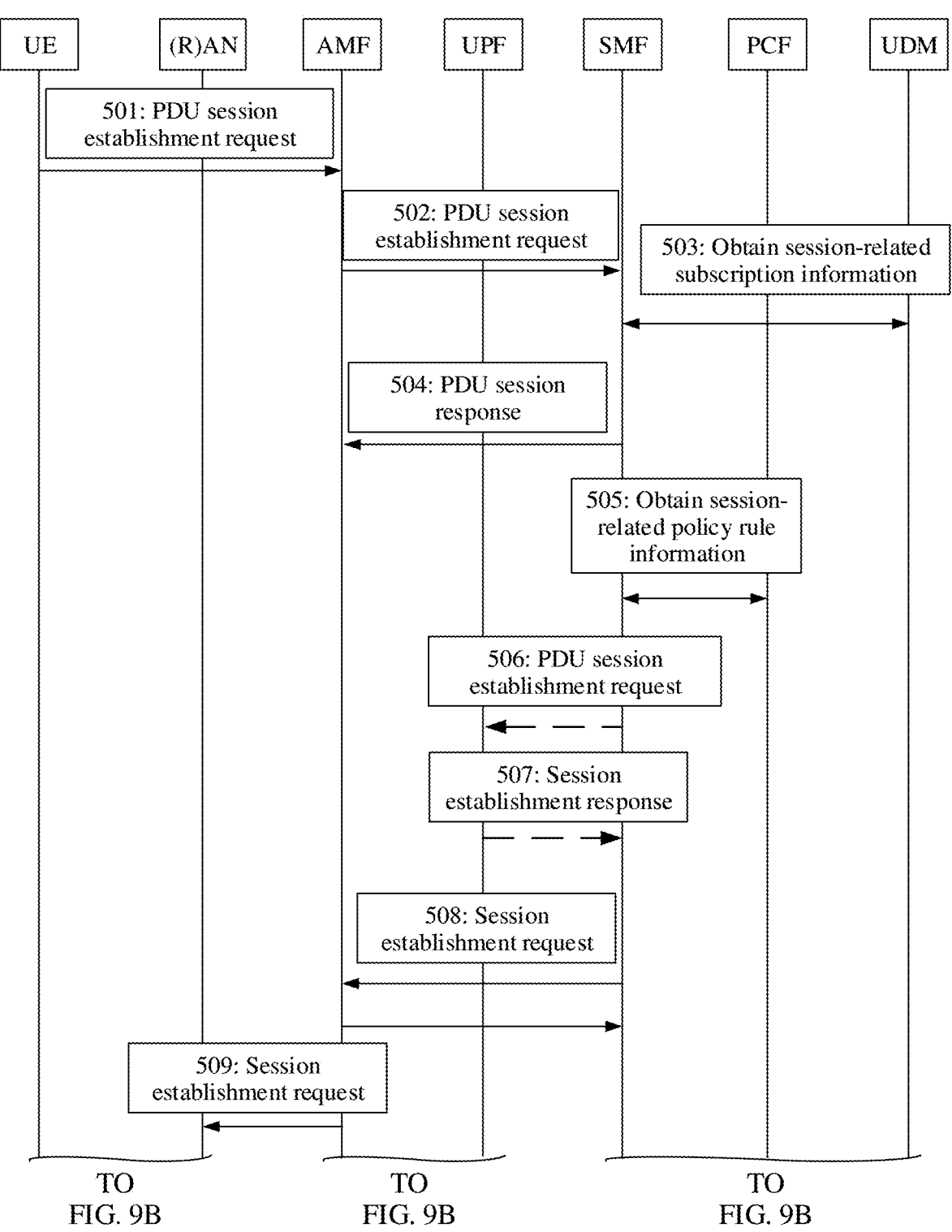
FIG. 9A and FIG. 9B are a schematic flowchart of a session establishment procedure.
Figure 9B:
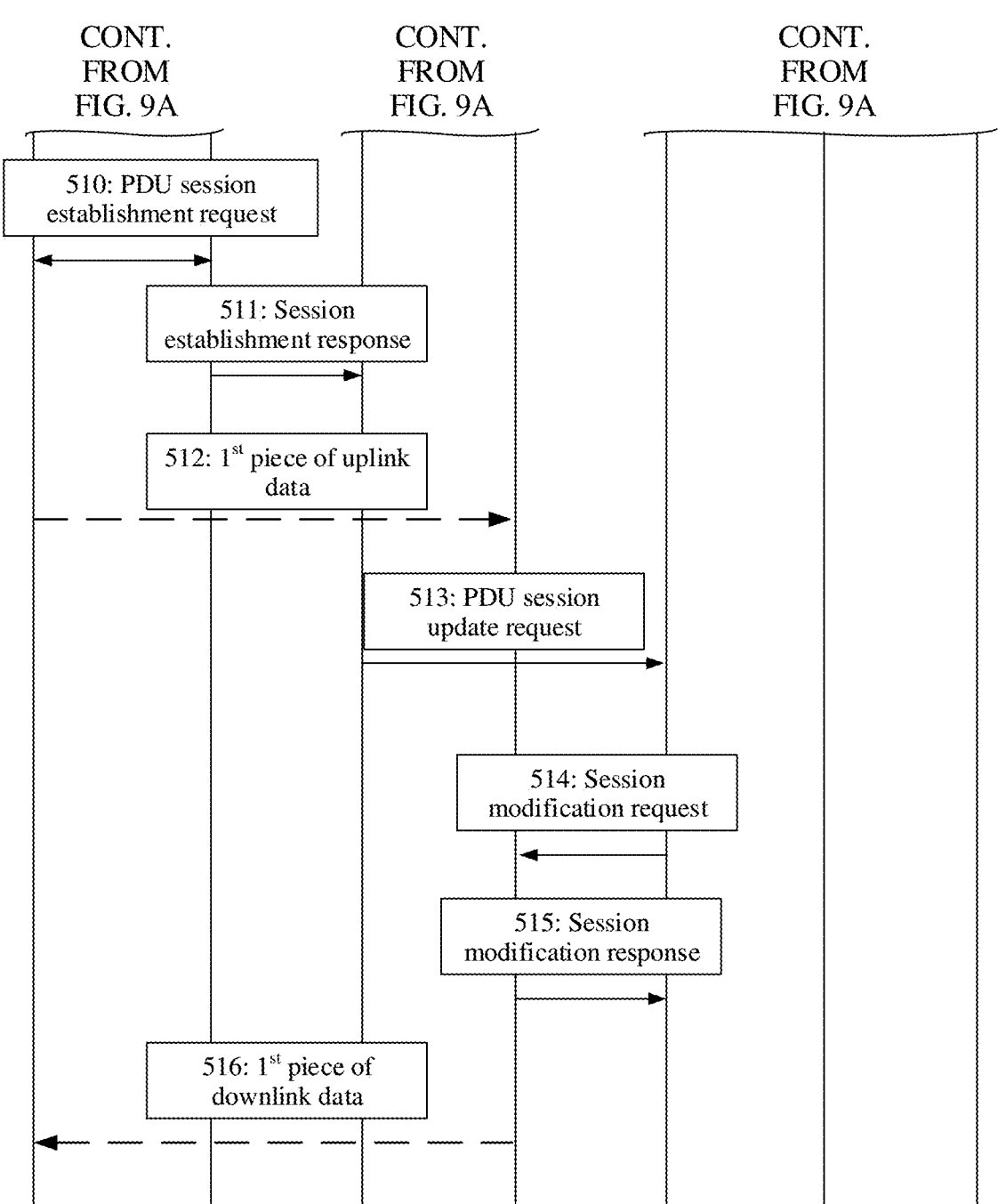

The following uses a 5G system as an example. FIG. 9A and FIG. 9B are an example of a schematic flowchart of a session establishment procedure. As shown in FIG. 9A and FIG. 9B, the procedure includes the following steps.

Step 501: A terminal device sends a PDU session establishment request message to an AMF, and the AMF receives the PDU session establishment request message.

During specific implementation, the PDU session establishment request message may be, for example, a PDU session establishment request.

Step 502: The AMF transmits the PDU session establishment request message to an SMF, and the SMF receives the PDU session establishment request message.

During specific implementation, the PDU session establishment request message in step 502 may be, for example, an Nsmf_PDU Session_CreateSMContext request.

Step 503: The SMF obtains session-related subscription information from a UDM.

During specific implementation, the session-related subscription information may be, for example, Subscription retrieval/Subscription for updates.

Step 504: The SMF feeds back a PDU session response message to the AMF, and the AMF receives the PDU session response message.

During specific implementation, the PDU session response message in step 504 may be, for example, an Nsmf_PDUSession_CreateSMContext response.

Step 505: The SMF obtains session-related policy rule information from a PCF.

During specific implementation, the session-related policy rule information may be, for example, SM Policy Association Establishment or SMF initiated SM Policy Association Modification.

Step 506: The SMF sends a session establishment request to a UPF, and the UPF receives the session establishment request.

During specific implementation, the session establishment request may be, for example, an N4 session establishment request.

A downlink data connection of a core network may be established through step 506.

Step 507: The UPF sends a session establishment response to the SMF, and the SMF receives the session establishment response.

During specific implementation, the session establishment response may be, for example, an N4 session establishment response.

Step 508: The SMF sends the PDU session establishment request message to the AMF, and the AMF receives the PDU session establishment request message.

During specific implementation, the PDU session establishment request message in step 508 may be, for example, an Namf_Communication_N1N2MessageTransfer message.

Step 509: The AMF sends a PDU session establishment request to a RAN, and the RAN receives the PDU session establishment request.

During specific implementation, the PDU session establishment request in step 509 may be, for example, an N2 PDU session request (NAS msg).

In step 509, the N2 PDU session request may be for triggering the RAN to establish an air interface resource for a PDU session.

Step 510: After establishing the air interface resource for the PDU session, the RAN sends the PDU session establishment request to the terminal device, and the terminal device receives the PDU session establishment request.

During specific implementation, the PDU session establishment request in step 510 may be, for example, an AN-specific resource setup (PDU Session Establishment Accept) request.

Step 511: The RAN sends a PDU session establishment response to the AMF, and the AMF receives the PDU session establishment response.

During specific implementation, the PDU session establishment response in step 511 may be, for example, an N2 PDU session response.

A downlink transmission path of user plane data may be established through the following step 512 to step 516.

Step 512: The terminal device sends the 1$^{st}$ piece of uplink data to the UPF, and the UPF receives the 1$^{st}$ piece of uplink data.

During specific implementation, the 1$^{st}$ piece of uplink data may be, for example, first uplink data.

Step 513: The AMF sends a PDU session update request to the SMF, and the SMF receives the PDU session update request.

During specific implementation, the PDU session update request may be, for example, an Nsmf_PDUSession_UpdateSMContext request.

Step 514: The SMF sends a session modification request to the UPF, and the UPF receives the session modification request.

During specific implementation, the session modification request may be, for example, an N4 session modification request.

Step 515: The UPF sends a session modification response to the SMF, and the SMF receives the session modification response.

During specific implementation, the session modification response may be, for example, an N4 session modification response.

Step 516: The UPF sends the 1$^{st}$ piece of downlink data to the terminal device, and the terminal device receives the 1$^{st}$ piece of downlink data.

During specific implementation, the 1$^{st}$ piece of downlink data may be, for example, first downlink data.

In this embodiment of this application, policy rule information of the terminal device may include an uplink transmission delay requirement and a downlink transmission delay requirement. A first communication device may be the terminal device or a user plane network element. When the first communication device is the user plane network element, for example, the UPF in FIG. 9A, the SMF may obtain the uplink transmission delay requirement and the downlink transmission delay requirement from the PCF through step 505. Further, the SMF may send the uplink transmission delay requirement and the downlink transmission delay requirement to the UPF through step 508.

When the first communication device is the terminal device, in the PDU session establishment procedure shown in FIG. 9A and FIG. 9B, the SMF may obtain the uplink transmission delay requirement and the downlink transmission delay requirement from the PCF through step 505. Further, the SMF transmits the uplink transmission delay requirement and the downlink transmission delay requirement of a service to the AMF through step 508. Further, the AMF sends the uplink transmission delay requirement and the downlink transmission delay requirement of the service to the terminal device through step 509 and step 510.

In this embodiment of this application, when the uplink transmission delay requirement and the downlink transmission delay requirement are transmitted between communication devices (for example, between the AMF and the terminal device), a corresponding service identifier may be also transmitted. The service identifier may be a quintuple of data. For example, a service identifier corresponding to the uplink transmission delay requirement may be a quintuple of uplink data. For another example, a service identifier corresponding to the downlink transmission delay requirement may be a quintuple of downlink data.

Figure 10:
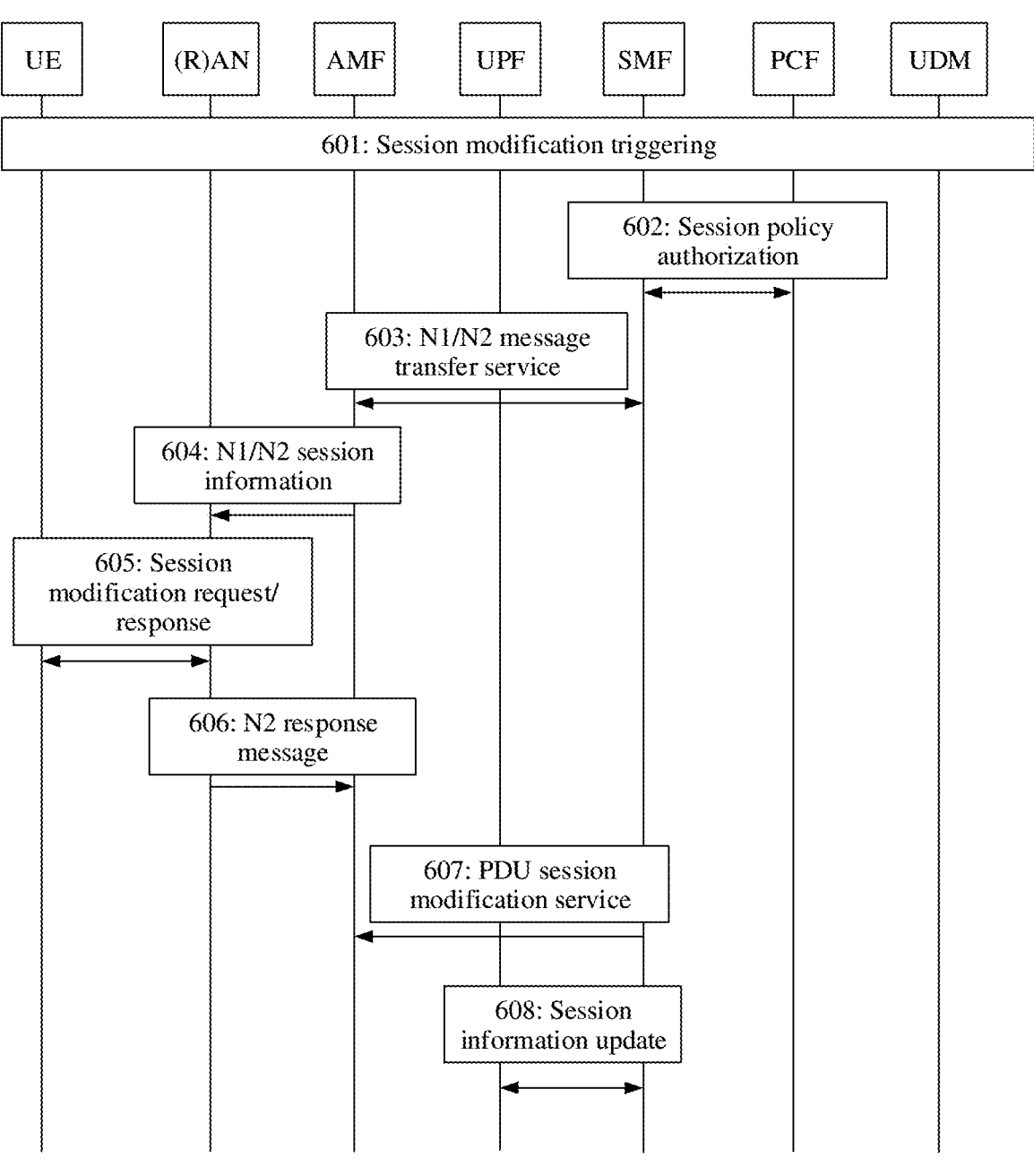
FIG. 10 is a schematic flowchart of a session modification procedure.

The following uses a 5G system as an example. FIG. 10 is an example of a schematic flowchart of a session modification procedure. As shown in FIG. 10, the procedure includes the following steps.

Step 601: The session modification procedure is triggered.

In step 601, the PDU session modification procedure may be triggered by a plurality of events, for example, a policy rule update.

Step 602: If an SMF needs to request session policy authorization again due to session modification, a session policy update is performed between the SMF and a PCF.

Step 603: The SMF invokes an N1/N2 message transfer service of an AMF, to send updated N1 interface session information and/or updated N2 interface session information to the AMF. The N1 session information may include a QoS rule sent to UE, and the N2 session information may include a QoS configuration file sent to an AN.

Message names used in step 603 may vary with trigger conditions of the session modification procedure.

Step 604: The AMF sends, to the AN by using an N2 message, the N1 session information and/or the N2 session information obtained from the SMF.

Step 605: The AN initiates an air interface resource modification procedure based on a received updated QoS parameter, to update an air interface resource related in the session modification. In addition, if the AN receives an N1 message (for example, a PDU session modification indication or a response message) from the SMF, the AN sends the N1 message to the UE.

Step 606: The AN sends an N2 response message to the AMF, where the N2 response message includes an accepted QoS flow identifier (QFI) list and/or a rejected QFI list.

Step 607: The AMF invokes a session modification service of the SMF, and sends, to the SMF, the information obtained from the AN.

Step 608: The SMF updates session information when necessary. Specifically, the SMF sends updated new session information (for example, the updated QoS parameter) to a UPF through an N4 interface.

In this embodiment of this application, policy rule information of the terminal device may include an uplink transmission delay requirement and a downlink transmission delay requirement. A first communication device may be the terminal device or a user plane network element. When the first communication device is the user plane network element, for example, the UPF in FIG. 10, the SMF may obtain the uplink transmission delay requirement and the downlink transmission delay requirement from the PCF through step 602. Further, the SMF may send the uplink transmission delay requirement and the downlink transmission delay requirement to the UPF through step 608.

When the first communication device is the terminal device, in the PDU session modification procedure shown in FIG. 10, the SMF may obtain the uplink transmission delay requirement and the downlink transmission delay requirement from the PCF through step 602. Further, the SMF transmits the uplink transmission delay requirement and the downlink transmission delay requirement of a service to the AMF through step 603. Further, the AMF sends the uplink transmission delay requirement and the downlink transmission delay requirement of the service to the terminal device through step 604 and step 605.

Figure 11:
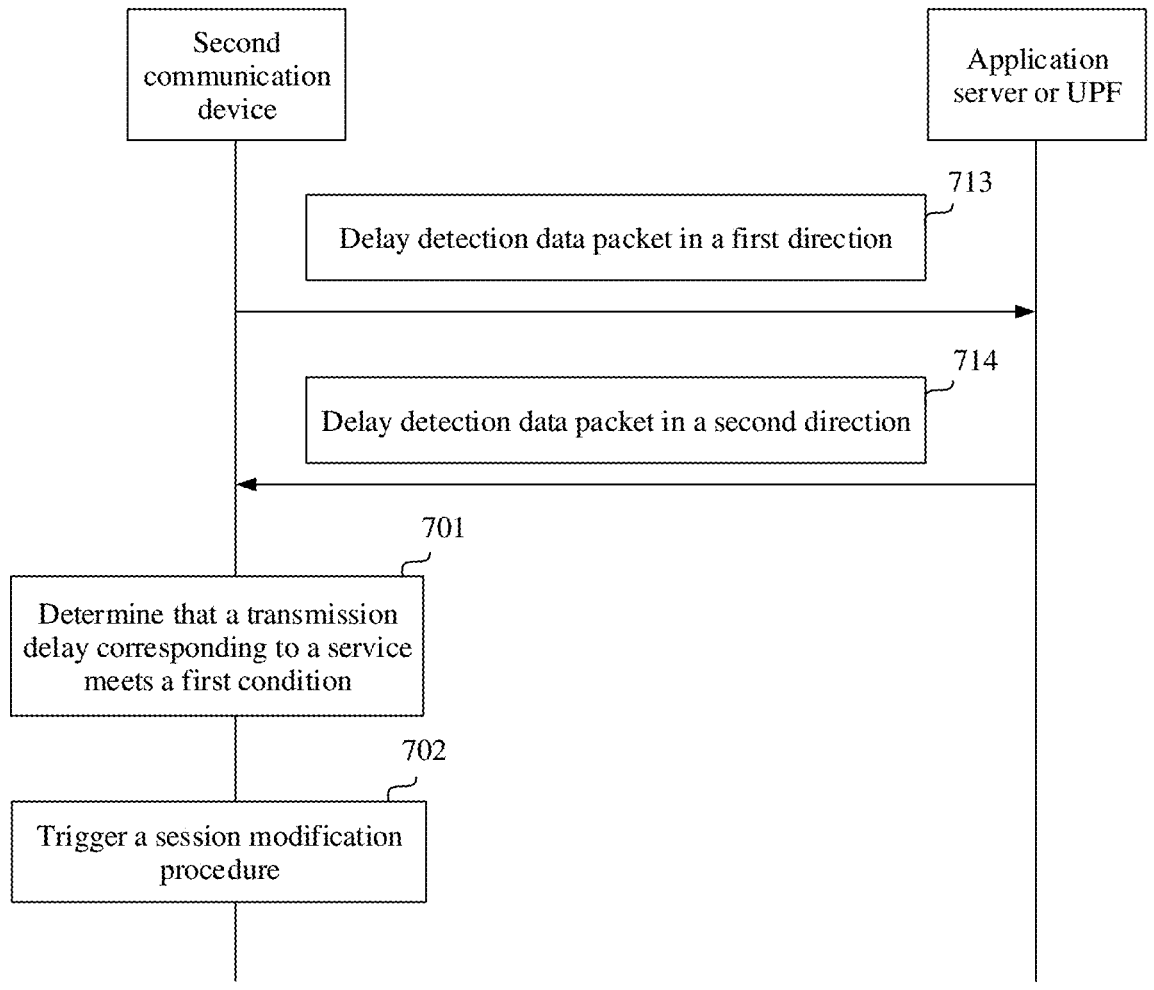
FIG. 11 is a schematic flowchart of a data transmission method according to an embodiment of this application.

FIG. 11 is an example of a schematic flowchart of a data transmission method. The method may be performed by a second communication device, and the second communication device may include a terminal device, a core network element, or a server. The core network element may include, for example, the UPF in FIG. 2. In FIG. 11, an example in which a first direction is an uplink direction and a second direction is a downlink direction, and the second communication device is the terminal device is used for description. As shown in FIG. 11, the method includes the following steps.

Step 713: The second communication device sends a delay detection data packet in the first direction based on a quality of service parameter in the first direction of a service, where the delay detection data packet in the first direction includes a time stamp that indicates a time point at which the delay detection data packet in the first direction is sent.

Step 714: The second communication device receives a delay detection data packet in the second direction, where the delay detection data packet in the second direction is sent based on a quality of service parameter in the second direction of the service. The second communication device determines a total transmission delay of the service based on a time point at which the delay detection data packet in the second direction is received and the time point at which the delay detection data packet in the first direction is sent.

Step 701: The second communication device determines that the service meets a first condition.

Step 702: The second communication device triggers a session modification procedure, where the session modification procedure is for modifying a quality of service parameter of the service.

The first condition includes one or more of the following content.

A transmission delay in the first direction of the service is greater than a transmission delay requirement in the first direction of the service, where if the first direction is the uplink direction, the second direction is the downlink direction, or if the first direction is the downlink direction, the second direction is the uplink direction, a transmission delay in the second direction of the service is greater than a transmission delay requirement in the second direction of the service, and the total transmission delay of the service is greater than a total transmission delay requirement of the service, where the total transmission delay is a sum of an uplink transmission delay and a downlink transmission delay, and the total transmission delay requirement is a sum of an uplink transmission delay requirement and a downlink transmission delay requirement.

The second communication device may obtain the total transmission delay requirement of the service through a session establishment procedure or the session modification procedure. The total transmission delay requirement is the sum of the uplink transmission delay requirement and the downlink transmission delay requirement. For a manner of obtaining the uplink transmission delay and the downlink transmission delay, refer to related content mentioned in FIG. 9A to FIG. 10.

In the solution provided in step 701 and step 702, in this embodiment of this application, when a transmission delay corresponding to the service does not meet a transmission delay requirement, the QoS parameter may be modified through the triggered session modification procedure. In other words, in this embodiment of this application, a QoS feedback mechanism is introduced, so that the QoS parameter is modified when the transmission delay does not meet the transmission delay requirement.

In step 702, there are a plurality of events that trigger the session modification procedure. The event that triggers the session modification procedure is added in this embodiment of this application. For the event that triggers the session modification procedure, refer to related content in step 601 in FIG. 10. In an optional implementation, the following events that trigger the session modification procedure are provided for step 601 in FIG. 10.

Event 1: UE-triggered event, where for example, the UE requests addition, modification, and deletion of a QoS flow.

Event 2: PCF-triggered event, where for example, a PCF initiates an update of policy rule information based on a change of an internal or external state.

Event 3: UDM-triggered event, where for example, session-related subscription information is updated.

Event 4: SMF-triggered event, where for example, an SMF triggers, based on a local policy, the addition, modification, and deletion of the QoS flow.

Event 5: (R)AN-triggered event, where for example, when an (R)AN determines that QoS characteristics of some QoS flows cannot be met or can be met again, the AN can also initiate the session modification procedure to notify a network.

In the event 1, the terminal device may alternatively trigger the session modification procedure after the terminal device performs step 701. In the event 4, the SMF may alternatively trigger the session modification procedure after receiving first signaling sent by the second communication device. Optionally, after the second communication device performs step 701, the second communication device may send the first signaling to the SMF (for example, when the second communication device is the server, the server may send the first signaling to the SMF through an NEF, for another example, when the second communication device is the terminal device, the terminal device may send the first signaling to the SMF, for still another example, when the second communication device is the UPF, the UPF may send the first signaling to the SMF). The first signaling is for enabling the SMF to send a session modification request.

In the foregoing step 702, the first signaling includes indication information that indicates an adjusted value of a to-be-adjusted parameter in the quality of service parameter. The to-be-adjusted parameter includes one or more of a QFI, a 5QI, a data packet transmission delay, a service transmission bit rate, and a service packet loss rate. In other words, modifying the quality of service parameter may be modifying one or more of the QFI, the 5QI, and the data packet transmission delay of the service, the service transmission bit rate, and the service packet loss rate. A priority may include the QFI and/or the 5QI.

The indication information that indicates the adjusted value of the to-be-adjusted parameter in the quality of service parameter may indicate an adjusted value of a to-be-adjusted parameter in a quality of service parameter corresponding to an uplink data packet, for example, an adjusted value of a to-be-adjusted parameter in a quality of service parameter corresponding to one recommended uplink data packet. Certainly, the indication information may alternatively indicate the transmission delay in the first direction and/or the transmission delay in the second direction. For another example, the indication information may indicate an adjustment amount of a transmission delay in a quality of service parameter corresponding to an uplink data packet and/or an adjustment amount of a transmission delay in a quality of service parameter corresponding to a downlink data packet. For example, if the uplink transmission delay requirement is 5 ms, and the uplink transmission delay is 7 ms, the first signaling may include indication information for indicating to adjust the transmission delay in the quality of service parameter corresponding to the uplink data packet to 3 ms. The indication information for indicating to adjust the transmission delay in the quality of service parameter corresponding to the uplink data packet to 3 ms may indicate to adjust the transmission delay to 3 ms, 7 ms, or 4 ms (7 ms−3 ms=4 ms).

Indication information that indicates an adjusted priority of the service may indicate an adjusted priority in the quality of service parameter corresponding to the uplink data packet and/or an adjusted priority in the quality of service parameter corresponding to the downlink data packet, for example, an adjusted priority in a quality of service parameter corresponding to one recommended uplink data packet.

Before step 701, the method further includes the second communication device determines the transmission delay of the service. The transmission delay corresponding to the service may be the uplink transmission delay of the service, the downlink transmission delay of the service, or the total transmission delay of the service. That the second communication device determines the transmission delay of the service may be specifically described in the following case b1, case b2, and case b3. Step 713 and step 714 in FIG. 11 are merely an example of a solution in which the second communication device determines the transmission delay of the service. The solution that is provided in step 713 and step 714 and that is used to determine the transmission delay of the service is described in the following case b3. In the following case b3, the example in which the second communication device is the terminal device is used for description in FIG. 11. In actual application, the second communication device may alternatively be another network element. For example, the second communication device is the UPF or the server.

Case b1: If the first condition includes that the transmission delay in the first direction is greater than the transmission delay requirement in the first direction, the second communication device receives the delay detection data packet in the first direction, where the delay detection data packet in the first direction is sent based on the quality of service parameter in the first direction of the service, and the delay detection data packet in the first direction includes the time stamp that indicates the time point at which the delay detection data packet in the first direction is sent, the second communication device determines the transmission delay in the first direction of the service based on a time point at which the delay detection data packet in the first direction is received and the time point at which the delay detection data packet in the first direction is sent.

In this embodiment of this application, the delay detection data packet may be referred to as a ping packet in English.

Case b2: If the first condition includes that the transmission delay in the second direction is greater than the transmission delay requirement in the second direction, before that the second communication device determines that a transmission delay corresponding to the service meets a first condition, the method further includes the second communication device receives the delay detection data packet in the second direction, where the delay detection data packet in the second direction is sent based on the quality of service parameter in the second direction of the service, and the delay detection data packet in the second direction includes a time stamp that indicates a time point at which the delay detection data packet in the second direction is sent, and the second communication device determines the transmission delay in the second direction of the service based on the time point at which the delay detection data packet in the second direction is received and the time point at which the delay detection data packet in the second direction is sent.

Case b3: The example in which the second communication device is the terminal device, the first direction is the uplink direction, and the second direction is the downlink direction is used for description in FIG. 11. If the first condition includes that the total transmission delay is greater than the total transmission delay requirement of the service, step 713 and step 714 are performed before step 701.

In this embodiment of this application, the delay detection data packet in the first direction is sent based on the quality of service parameter in the first direction of the service, and the delay detection data packet in the second direction is sent based on the quality of service parameter in the second direction of the service. The second communication device may obtain the quality of service parameter in the first direction and/or the quality of service parameter in the second direction through related procedures in the session establishment request and the session modification request that are mentioned in FIG. 9A to FIG. 10. The quality of service parameter may be stored in the policy rule information. For a manner in which the second communication device obtains the quality of service parameter in the first direction and/or the quality of service parameter in the second direction, refer to the manners of obtaining the uplink transmission delay requirement and the downlink transmission delay requirement that are mentioned in FIG. 9A to FIG. 10. The manners are similar, and details are not described herein again.

In this embodiment of this application, the delay detection data packet in the first direction further includes a service identifier, and the service identifier may be an identifier of a service that needs to be tested, for example, the service mentioned in step 701. For example, when the first direction is the uplink direction, the service identifier included in the delay detection data packet in the first direction may be a quintuple of the uplink data packet of the service. For example, when the first direction is the downlink direction, the service identifier included in the delay detection data packet in the first direction may be a quintuple of the downlink data packet of the service. In case b3, an uplink delay detection data packet and a downlink delay detection data packet corresponding to one service may be determined based on a correspondence between a service identifier included in the uplink delay detection data packet and a service identifier included in the downlink delay detection data packet. Therefore, the transmission delay in the second direction of the service may be determined based on a time point at which the uplink delay detection data packet is sent and a time point at which the downlink delay detection data packet is received.

In case b1, case b2, and case b3, two ends of the delay detection data packet in the first direction and the delay detection data packet in the second direction may be between the terminal device and the UPF. In other words, the delay detection data packet in the first direction and the delay detection data packet in the second direction are transmitted between the terminal device and the UPF. In this case, the determined transmission delay in the first direction, the determined transmission delay in the second direction, and the determined total transmission delay are all between the terminal device and the UPF. In another optional implementation, in case b1, case b2, and case b3, two ends of the delay detection data packet in the first direction and the delay detection data packet in the second direction may be between the terminal device and the server. In other words, the delay detection data packet in the first direction and the delay detection data packet in the second direction are transmitted between the terminal device and the application server. In this case, the determined transmission delay in the first direction, the determined transmission delay in the second direction, and the determined total transmission delay are all between the terminal device and the server.

Figure 12:
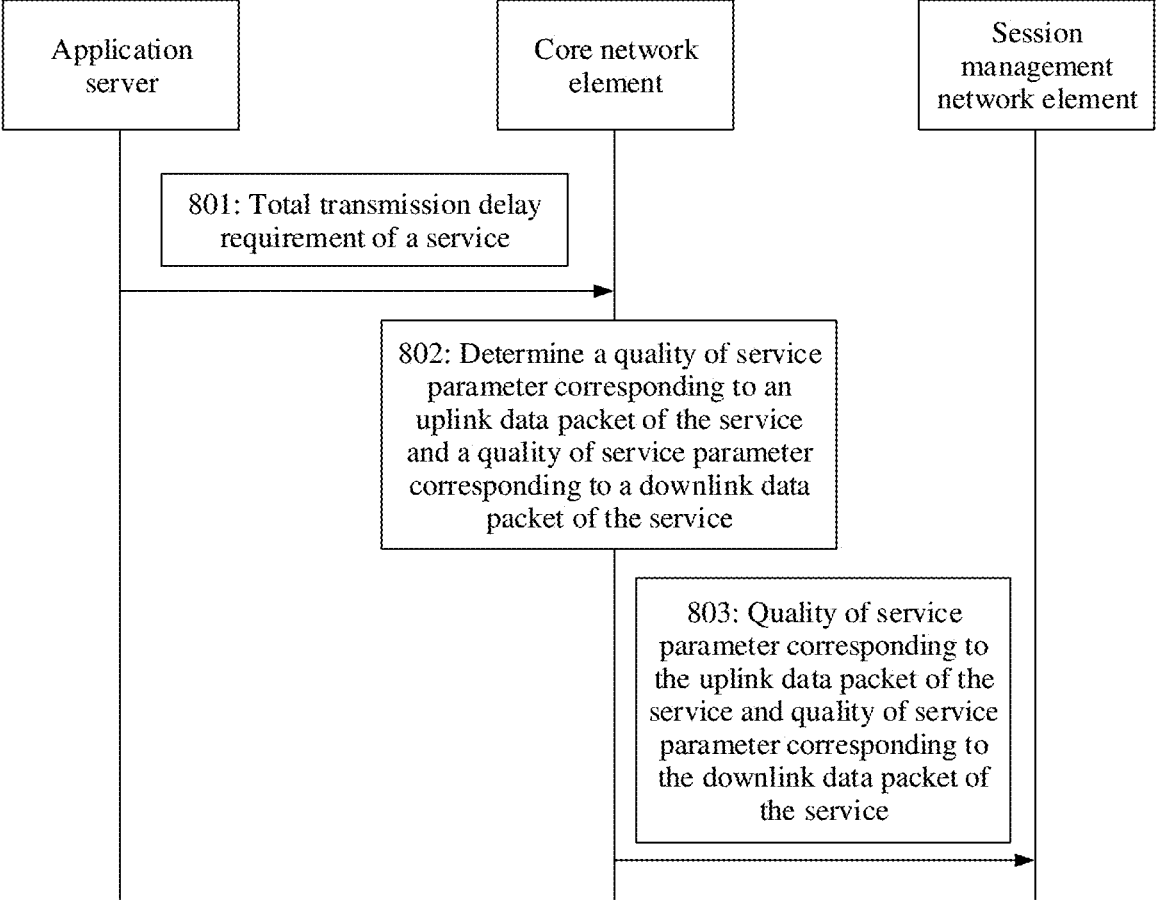
FIG. 12 is a schematic flowchart of a data transmission method according to an embodiment of this application.

An example in which the communication system shown in FIG. 3 is used in the 5G network architecture in the non-roaming scenario shown in FIG. 4 or FIG. 5 is used. FIG. 12 shows a data transmission method according to an embodiment of this application. A solution in FIG. 12 may be performed by the core network element 1201 in FIG. 3, and the core network element may be, for example, the NEF or the PCF in FIG. 2. As shown in FIG. 12, the method includes the following steps.

Step 801: The core network element receives a total transmission delay requirement of a service sent by an application server.

In step 801, the total transmission delay requirement of the service sent by the application server may be transmitted by using a session QoS establishment request. During specific implementation, the session QoS establishment request may be an Nnef_AFsessionWithQoS_Create request.

Optionally, the total transmission delay requirement corresponds to a service identifier, and the server may send the service identifier and the total transmission delay requirement corresponding to the service identifier to the core network element.

Step 802: The core network element determines a quality of service parameter corresponding to an uplink data packet of the service and a quality of service parameter corresponding to a downlink data packet of the service based on the total transmission delay requirement of the service.

Step 802 may be performed by the NEF. If the NEF performs step 802, the NEF may perform step 803 after performing step 802.

In step 802, one of the quality of service parameter corresponding to the uplink data packet and the quality of service parameter corresponding to the downlink data packet includes one or more of a QFI, a 5QI, a data packet transmission delay, a service transmission bit rate, and a service packet loss rate.

In step 802, the core network element may decompose an uplink QoS requirement and a downlink QoS requirement based on the total transmission delay requirement of the service, to obtain the quality of service parameter corresponding to the uplink data packet of the service and the quality of service parameter corresponding to the downlink data packet of the service. For some services, for example, the interactive service mentioned in FIG. 1, the server does not care about an uplink transmission delay and a downlink transmission delay, but cares more about a total transmission delay. Therefore, the server only needs to report the total transmission delay requirement required by the server. Then, the core network element decomposes the uplink QoS requirement and the downlink QoS requirement. In this way, assignment between network elements is more reasonable.

For example, the total transmission delay requirement of the service is 20 ms. The core network element allocates a QoS requirement between uplink transmission and downlink transmission based on the total delay requirement of 20 ms. For example, an uplink transmission delay requirement may be set to 5 ms. A downlink transmission delay requirement is set to 15 ms. The uplink transmission delay is a quality of service parameter corresponding to a QoS flow corresponding to the uplink data packet, and the downlink transmission delay is a quality of service parameter corresponding to a QoS flow corresponding to the downlink data packet.

In step 802, there are a plurality of implementations. In an optional implementation, the core network element may determine the uplink transmission delay requirement and the downlink transmission delay requirement of the service based only on the total transmission delay requirement of the service. In another optional implementation, the core network element determines the uplink transmission delay requirement and the downlink transmission delay requirement of the service based on the total transmission delay requirement of the service and at least one of a network capability and a network status. In this way, the determined quality of service parameter corresponding to the uplink data packet of the service and the determined quality of service parameter corresponding to the downlink data packet of the service can be more appropriate, and a difference between an actual delay of a data packet and a delay required in a quality of service parameter can be reduced.

In an optional implementation, the network capability includes an uplink bandwidth capability of a network and/or a downlink bandwidth capability of the network. In another optional implementation, the network status includes one or more of a load status of an uplink of an access network, a load status of a downlink of the access network, the uplink transmission delay of an uplink delay detection data packet, and the downlink transmission delay of a downlink delay detection data packet.

Step 803: The core network element may send the quality of service parameter corresponding to the uplink data packet of the service and the quality of service parameter corresponding to the downlink data packet of the service to a session management network element (for example, the SMF network element in FIG. 2) through a session establishment procedure or a session modification procedure. The session management network element executes the quality of service parameter corresponding to the uplink data packet of the service and the quality of service parameter corresponding to the downlink data packet of the service.

For example, in step 803, when the core network element is the PCF, the quality of service parameter corresponding to the uplink data packet of the service and the quality of service parameter corresponding to the downlink data packet of the service may be sent to the SMF through step 503 in FIG. 9A or step 602 in FIG. 10.

In step 803, that the session management network element executes the quality of service parameter corresponding to the uplink data packet of the service and the quality of service parameter corresponding to the downlink data packet of the service may include the session management network element sends the quality of service parameter corresponding to the uplink data packet and the quality of service parameter corresponding to the downlink data packet to a user plane network element, and the user plane network element schedules the uplink data packet based on the quality of service parameter corresponding to the uplink data packet and schedules the downlink data packet based on the quality of service parameter corresponding to the downlink data packet.

Figure 13:
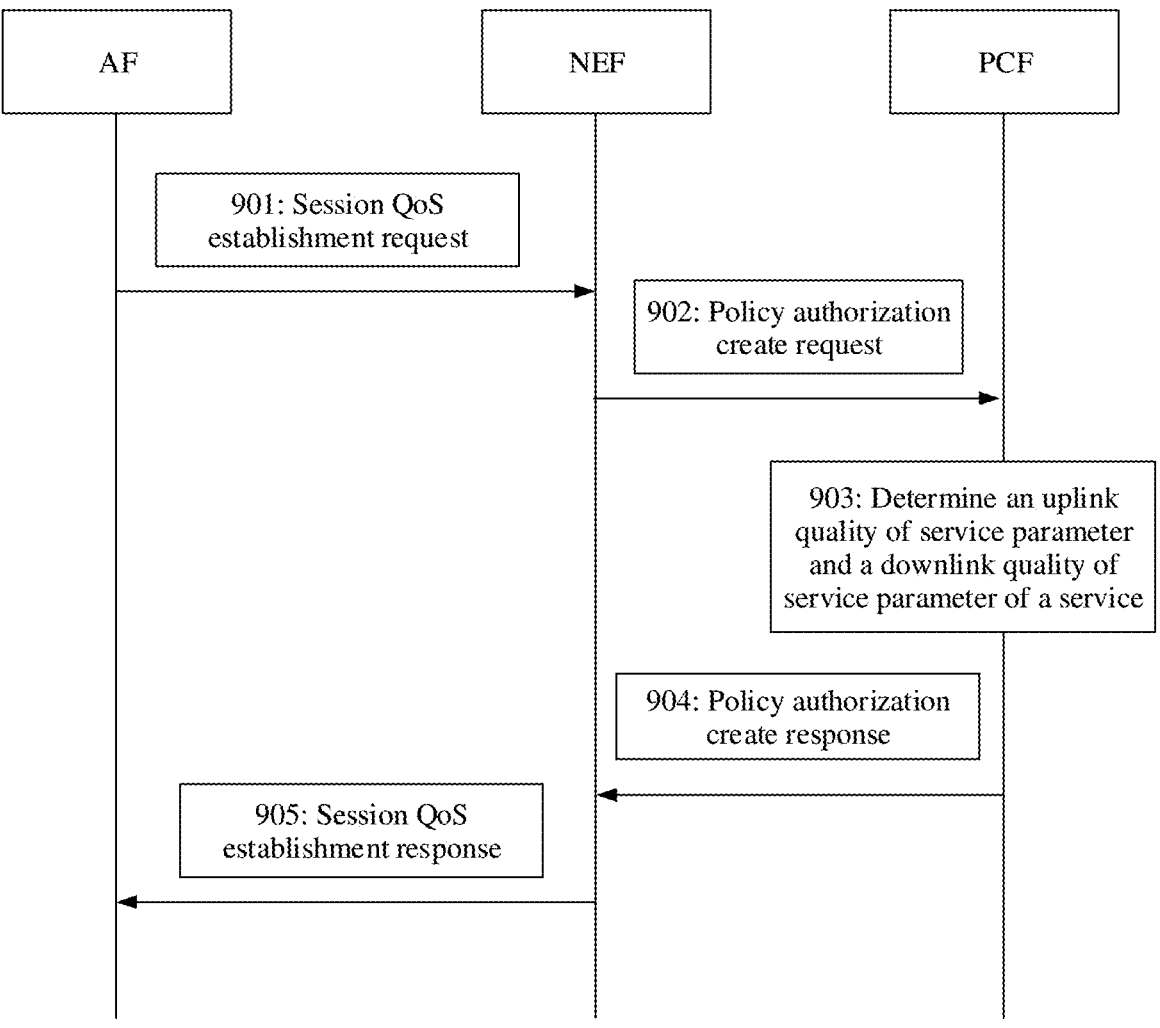
FIG. 13 is a schematic flowchart of a data transmission method according to an embodiment of this application.

In FIG. 12, if step 802 is not performed by the NEF, for example, is performed by the PCF, the NEF may send a policy authorization create request to the PCF, and the PCF performs step 802 after receiving the request. After performing step 802, the PCF returns a session QoS establishment response to the NEF and the server. This implementation is illustrated by using another data transmission method shown in FIG. 13. In FIG. 13, an example in which the core network element in FIG. 12 is a PCF is used for illustration. The method includes the following steps.

Step 901: A server sends a session QoS establishment request to an NEF.

During specific implementation, the session QoS establishment request may be an Nnef_AFsessionWithQoS_Create request, and may include a total transmission delay requirement of a service.

Step 902: The NEF sends a policy authorization create request to the PCF.

During specific implementation, the policy authorization create request may be an Npcf_Policy Authorization_Create request.

Step 903: The PCF determines a quality of service parameter corresponding to an uplink data packet of the service and a quality of service parameter corresponding to a downlink data packet of the service based on the total transmission delay requirement of the service.

During specific implementation, after step 903, the PCF may perform the solution of step 803. To be specific, the PCF may send the quality of service parameter corresponding to the uplink data packet of the service and the quality of service parameter corresponding to the downlink data packet of the service to a session management network element through a session establishment procedure or a session modification procedure. For a related solution of this part, refer to related descriptions in FIG. 8. Details are not described herein again.

Step 904: The PCF sends a policy authorization create response to the NEF.

During specific implementation, the policy authorization create response may be an Npcf_Policy Authorization_Create response.

Step 905: The NEF returns a session QoS establishment response.

During specific implementation, the QoS establishment response may be an Nnef_AFsessionWithQoS_Create response.

An action of the first communication device in step 301 to step 304 in FIG. 7 may be performed by the processor 1401 in the communication device 1400 shown in FIG. 6 by invoking the application program code stored in the memory 1403. This is not limited in this embodiment.

An action of the second communication device in step 701 and step 702 in FIG. 11 may be performed by the processor 1401 in the communication device 1400 shown in FIG. 6 by invoking the application program code stored in the memory 1403. This is not limited in this embodiment.

An action of the core network element in step 802 in FIG. 12 may be performed by the processor 1401 in the communication device 1400 shown in FIG. 6 by invoking the application program code stored in the memory 1403. This is not limited in this embodiment.

It should be noted that the embodiments shown in FIG. 7 to FIG. 10 are described by using an example in which the communication system shown in FIG. 2 is used in the 5G network architecture in the non-roaming scenario shown in FIG. 4 or FIG. 5, and the embodiments shown in FIG. 12 and FIG. 13 are described by using an example in which the communication system shown in FIG. 3 is used in the 5G network architecture in the non-roaming scenario shown in FIG. 4 or FIG. 5. If an example in which the communication system shown in FIG. 2 or FIG. 3 is used in a 5G network architecture in a local breakout roaming scenario is used for description, or an example in which the communication system shown in FIG. 2 or FIG. 3 is used in a 5G network architecture in a home routed roaming scenario is used for description, a corresponding data transmission method is similar to the methods in the foregoing embodiments, and only adaptive replacement needs to be performed on related network elements. Details are not described herein again.

It may be understood that in the foregoing embodiments, the methods and/or steps implemented by the first communication device may alternatively be implemented by a component (for example, a chip or a circuit) that can be used in the first communication device, the methods and/or steps implemented by the second communication device may alternatively be implemented by a component (for example, a chip or a circuit) that can be used in the second communication device, and the methods and/or steps implemented by the core network element may alternatively be implemented by a component (for example, a chip or a circuit) that can be used in the core network element.

The foregoing mainly describes the solutions provided in embodiments of this application from the perspective of interaction between network elements. Correspondingly, an embodiment of this application further provides a communication apparatus. The communication apparatus may be the first communication device in the foregoing method embodiments, an apparatus including the first communication device, or a component that can be used in the first communication device. Alternatively, the communication apparatus may be the second communication device in the foregoing method embodiments, an apparatus including the second communication device, or a component that can be used in the second communication device. Alternatively, the communication apparatus may be the core network element in the foregoing method embodiments, an apparatus including the core network element, or a component that can be used in the core network element. It can be understood that, to implement the foregoing functions, the communication apparatus includes a corresponding hardware structure and/ or software module for performing the functions. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 14:
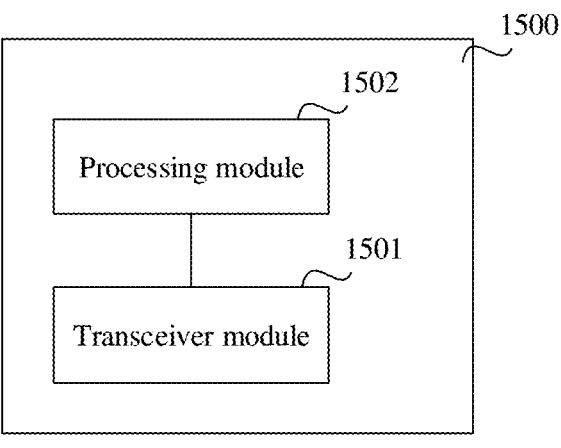
FIG. 14 is a schematic diagram of a structure of another communication apparatus according to an embodiment of this application.

Based on the foregoing content, FIG. 14 is a schematic diagram of a structure of a communication apparatus 1500. The communication apparatus 1500 includes a transceiver module 1501 and a processing module 1502. The transceiver module 1501 may also be referred to as a transceiver unit, and is configured to implement a transceiver function. For example, the transceiver module 1501 may be a transceiver circuit, a transceiver, a transceiver, or a communication interface.

In this embodiment, the communication apparatus 1500 is presented in a form of functional modules obtained through integration. Herein, the "module" may be a specific ASIC, a circuit, a processor that executes one or more software or firmware programs and a memory, an integrated logic circuit, and/or another component that can provide the foregoing functions. In a simple embodiment, a person skilled in the art may figure out that the communication apparatus 1500 may be in a form of the communication device 1400 shown in FIG. 6.

For example, the processor 1401 in the communication device 1400 shown in FIG. 6 may invoke the computer-executable instructions stored in the memory 1403, to enable the communication device 1400 to perform the data transmission methods in the foregoing method embodiments.

Specifically, functions/implementation processes of the transceiver module 1501 and the processing module 1502 in FIG. 14 may be implemented by the processor 1401 in the communication device 1400 shown in FIG. 6 by invoking the computer-executable instructions stored in the memory 1403. Alternatively, functions/implementation processes of the processing module 1502 in FIG. 14 may be implemented by the processor 1401 in the communication device 1400 shown in FIG. 6 by invoking the computer-executable instructions stored in the memory 1403. Functions/implementation processes of the transceiver module 1501 in FIG. 14 may be implemented by using the communication interface 1404 in the communication device 1400 shown in FIG. 6.

The communication apparatus 1500 provided in this embodiment may perform the foregoing data transmission methods. Therefore, for technical effects that can be achieved by the communication apparatus 1500, refer to the foregoing method embodiments. Details are not described herein again.

For example, the communication apparatus 1500 is the foregoing first communication device. When the communication apparatus 1500 is configured to perform the method performed by the first communication device, the transceiver module 1501 is configured to receive a data packet in a first direction, and receive a data packet in a second direction, the processing module 1502 is configured to send the data packet in the second direction through the transceiver module 1501 based on a total transmission delay requirement and a time point at which the data packet in the first direction is sent, where the data packet in the first direction includes a time stamp that indicates the time point at which the data packet in the first direction is sent, the data packet in the first direction and the data packet in the second direction correspond to a same service, if the first direction is an uplink direction, the second direction is a downlink direction, or if the first direction is a downlink direction, the second direction is an uplink direction, and the total transmission delay requirement is a sum of a transmission delay requirement in the first direction and a transmission delay requirement in the second direction.

When the communication apparatus 1500 is configured to perform the method performed by the first communication device, in a possible implementation, the data packet in the first direction includes a group identifier, and the data packet in the second direction includes a group identifier. The processing module 1502 is further configured to, if determining that the group identifier of the data packet in the second direction has an association relationship with the group identifier of the data packet in the first direction, determine that the data packet in the first direction and the data packet in the second direction correspond to the same service.

When the communication apparatus 1500 is configured to perform the method performed by the first communication device, in a possible implementation, the processing module 1502 is specifically configured to determine a transmission delay in the first direction based on a time point at which the data packet in the first direction is received and the time point at which the data packet in the first direction is sent, determine a target transmission delay in the second direction based on a difference between the total transmission delay requirement and the transmission delay in the first direction, and send the data packet in the second direction based on the target transmission delay in the second direction.

When the communication apparatus 1500 is configured to perform the method performed by the first communication device, in a possible implementation, the processing module 1502 is specifically configured to determine a target transmission delay in the second direction based on a difference between the total transmission delay requirement and duration, where the duration is between a time point at which the first communication device receives the data packet in the second direction and the time point at which the data packet in the first direction is sent, and send the data packet in the second direction based on the target transmission delay in the second direction.

When the communication apparatus 1500 is configured to perform the method performed by the first communication device, in a possible implementation, the processing module 1502 is further configured to if the transmission delay requirement in the second direction of the data packet in the second direction does not meet the target transmission delay in the second direction, perform one or more of reducing a transmission delay in a quality of service parameter of the data packet in the second direction, increasing a sending priority of the data packet in the second direction, increasing a service transmission bit rate in the second direction, and increasing a service packet loss rate.

When the communication apparatus 1500 is configured to perform the method performed by the first communication device, in a possible implementation, the processing module 1502 is further configured to obtain the total transmission delay requirement of the service through a session establishment procedure or a session modification procedure.

The communication apparatus 1500 provided in this embodiment may perform the method performed by the first communication device. Therefore, for related descriptions and technical effects that can be achieved by the communication apparatus 1500, refer to the foregoing method embodiments. Details are not described herein again.

For example, the communication apparatus 1500 is the foregoing second communication device. When the communication apparatus 1500 is configured to perform the method performed by the second communication device, the processing module 1502 is configured to determine that a service meets a first condition, and trigger a session modification procedure, where the session modification procedure is for modifying a quality of service parameter of the service. For content of the first condition, refer to related content in the foregoing embodiments. Details are not described herein again.

When the communication apparatus 1500 is configured to perform the method performed by the second communication device, in a possible implementation, if the first condition is that a total transmission delay is greater than a total transmission delay requirement of the service, the processing module 1502 is further configured to send a delay detection data packet in a first direction through the transceiver module 1501 based on a quality of service parameter in the first direction of the service, where the delay detection data packet in the first direction includes a time stamp that indicates a time point at which the delay detection data packet in the first direction is sent, and determine the total transmission delay of the service based on a time point at which a delay detection data packet in a second direction is received and the time point at which the delay detection data packet in the first direction is sent, the transceiver module 1501 is further configured to receive the delay detection data packet in the second direction, where the delay detection data packet in the second direction is sent based on a quality of service parameter in the second direction of the service, and if the first direction is an uplink direction, the second direction is a downlink direction, or if the first direction is a downlink direction, the second direction is an uplink direction.

When the communication apparatus 1500 is configured to perform the method performed by the second communication device, in a possible implementation, if the first condition is that a transmission delay in a first direction is greater than a transmission delay requirement in the first direction, the transceiver module 1501 is further configured to receive a delay detection data packet in the first direction, where the delay detection data packet in the first direction includes a time stamp that indicates a time point at which the delay detection data packet in the first direction is sent, the processing module 1502 is further configured to determine the transmission delay in the first direction of the service based on a time point at which the delay detection data packet in the first direction is received and the time point at which the delay detection data packet in the first direction is sent.

When the communication apparatus 1500 is configured to perform the method performed by the second communication device, in a possible implementation, if the first condition is that a transmission delay in a second direction is greater than a transmission delay requirement in the second direction, the transceiver module 1501 is further configured to receive a delay detection data packet in the second direction, where the delay detection data packet in the second direction includes a time stamp that indicates a time point at which the delay detection data packet in the second direction is sent, the processing module 1502 is further configured to determine the transmission delay in the second direction of the service based on a time point at which the delay detection data packet in the second direction is received and the time point at which the delay detection data packet in the second direction is sent.

When the communication apparatus 1500 is configured to perform the method performed by the second communication device, in a possible implementation, the transceiver module 1501 is specifically configured to send first signaling to a session management function network element, where the first signaling is for enabling the session management function network element to send a session modification request. The first signaling includes indication information that indicates an adjusted value of a to-be-adjusted parameter in the quality of service parameter. The to-be-adjusted parameter includes one or more of a quality of service flow identifier, a 5G quality of service identifier, a data packet transmission delay, a service transmission bit rate, and a service packet loss rate.

The communication apparatus 1500 provided in this embodiment may perform the method performed by the second communication device. Therefore, for related descriptions and technical effects that can be achieved by the communication apparatus 1500, refer to the foregoing method embodiments. Details are not described herein again.

For example, the communication apparatus 1500 is the foregoing core network element. When the communication apparatus 1500 is configured to perform the method performed by the core network element, the transceiver module 1501 is configured to receive a total transmission delay requirement of a service sent by an application service module. The processing module 1502 is configured to determine a quality of service parameter corresponding to an uplink data packet of the service and a quality of service parameter corresponding to a downlink data packet of the service based on the total transmission delay requirement of the service.

When the communication apparatus 1500 is configured to perform the method performed by the core network element, in a possible implementation, the processing module 1502 is specifically configured to determine an uplink transmission delay requirement and a downlink transmission delay requirement of the service based on the total transmission delay requirement of the service and at least one of a network capability and a network status.

When the communication apparatus 1500 is configured to perform the method performed by the core network element, in a possible implementation, the transceiver module 1501 is further configured to send the quality of service parameter corresponding to the uplink data packet of the service and the quality of service parameter corresponding to the downlink data packet of the service to the session management network element through a session establishment procedure or a session modification procedure.

The communication apparatus 1500 provided in this embodiment may perform the method performed by the core network element. Therefore, for related descriptions and technical effects that can be achieved by the communication apparatus 1500, refer to the foregoing method embodiments. Details are not described herein again.

It should be noted that one or more of the foregoing modules or units may be implemented by using software, hardware, or a combination thereof. When any one of the foregoing modules or units is implemented by software, the software exists in a form of computer program instructions, and is stored in the memory. The processor may be configured to execute the program instructions and implement the foregoing method procedures. The processor may be built into a SoC (system-on-a-chip) or an ASIC, or may be an independent semiconductor chip. The processor includes a core for executing software instructions to perform operations or processing, and may further include a necessary hardware accelerator, for example, a field programmable gate array (FPGA), a PLD (programmable logic device), or a logic circuit that implements a special-purpose logic operation.

When the foregoing modules or units are implemented by using hardware, the hardware may be any one or any combination of a CPU, a microprocessor, a digital signal processing (DSP) chip, a microcontroller unit (MCU), an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedures.

Optionally, an embodiment of this application further provides a communication apparatus (where for example, the communication apparatus may be a chip or a chip system). The communication apparatus includes a processor, configured to implement the method according to any one of the foregoing method embodiments. In a possible design, the communication apparatus further includes a memory. The memory is configured to store necessary program instructions and data. The processor may invoke program code stored in the memory, to indicate the communication apparatus to perform the method according to any one of the foregoing method embodiments. Certainly, the memory may alternatively not be located in the communication apparatus. When the communication apparatus is the chip system, the communication apparatus may include a chip, or may include a chip and another discrete component. This is not specifically limited in embodiments of this application.

All or some of the foregoing embodiments may be implemented by using software, hardware, firmware, or any combination thereof. When a software program is used to implement embodiments, all or some of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of multiple. A single processor or another unit may implement several functions listed in the claims. Some measures are recorded in dependent claims that are different from each other, but this does not mean that these measures cannot be combined to produce a better effect.

Although this application is described with reference to specific features and embodiments thereof. It is clear that, various modifications and combinations may be made to them without departing from the spirit and scope of this application. Correspondingly, the specification and accompanying drawings are merely example descriptions of this application defined by the accompanying claims, and are considered as any of or all modifications, variations, combinations or equivalents that cover the scope of this application. It is clear that, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A data transmission method, comprising:

receiving, by a first communication device, a first data packet in a first direction from a second communication device, wherein the first data packet in the first direction comprises a time stamp that indicates a time point at which the first data packet in the first direction is sent from the second communication device, and wherein the first direction is one of an uplink direction or a downlink direction;

acquiring, by the first communication device, from a third communication device, policy rule information of the second communication device, wherein the policy rule information comprises at least an uplink transmission delay requirement for a service and further comprises a downlink transmission delay requirement for the service;

receiving, by the first communication device, a second data packet in a second direction, wherein the first data packet in the first direction and the second data packet in the second direction correspond to a same service, and wherein the second direction is one of an uplink direction or a downlink direction that is different from the first direction;

adjusting a quality of service parameter of the second data packet in the second direction prior to sending the second data packet, and in response to a transmission delay requirement for the second direction not meeting a target transmission delay in the second direction, wherein the transmission delay requirement for the second direction is one of the uplink transmission delay requirement or the downlink transmission delay requirement of the policy rule information; and sending, by the first communication device, the second data packet in the second direction based on the quality of service parameter and further based on a total transmission delay requirement and the time point at which the first data packet in the first direction is sent from the second communication device, wherein the second data packet is a response to the first data packet, and wherein the total transmission delay requirement is a sum of the uplink transmission delay requirement and the downlink transmission delay requirement.

2. The method according to claim 1, wherein the first data packet in the first direction comprises a group identifier, and the second data packet in the second direction comprises a group identifier; and wherein the method further comprises:

determining, by the first communication device, if the first communication device determines that the group identifier of the second data packet in the second direction has an association relationship with the group identifier of the first data packet in the first direction, that the first data packet in the first direction and the second data packet in the second direction correspond to the same service.

3. The method according to claim 2, wherein a group identifier comprised in an uplink data packet is carried at an internet protocol (IP) layer or a general packet radio service tunneling protocol (GTP) layer of the uplink data packet; or a group identifier comprised in a downlink data packet is carried at an IP layer of the downlink data packet.

4. The method according to claim 1, wherein sending, by the first communication device, the second data packet in the second direction based on the total transmission delay requirement and the time point at which the first data packet in the first direction is sent from the second communication device comprises:

determining, by the first communication device, a transmission delay in the first direction based on a time point at which the first data packet in the first direction is received and the time point at which the first data packet in the first direction is sent;

determining, by the first communication device, a target transmission delay in the second direction based on a difference between the total transmission delay requirement and the transmission delay in the first direction; and sending, by the first communication device, the second data packet in the second direction based on the target transmission delay in the second direction.

5. The method according to claim 1, wherein sending, by the first communication device, the second data packet in the second direction based on the total transmission delay requirement and the time point at which the first data packet in the first direction is sent from the second communication device comprises:

determining, by the first communication device, a target transmission delay in the second direction based on a difference between the total transmission delay requirement and a duration, wherein the duration is a time between a time point at which the first communication device receives the second data packet in the second direction and a time point at which the first data packet in the first direction is sent from the first communication device; and sending, by the first communication device, the second data packet in the second direction based on the target transmission delay in the second direction.

6. The method according to claim 4, wherein the adjusting the quality of service parameter comprises performing one or more of:

reducing a transmission delay in the quality of service parameter of the second data packet in the second direction;

increasing a sending priority of the second data packet in the second direction;

increasing a service transmission bit rate in the second direction; and decreasing a service packet loss rate.

7. The method according to claim 1, wherein the method further comprises:

obtaining, by the first communication device, the total transmission delay requirement of the service through a session establishment procedure or a session modification procedure.

8. A first communication device, comprising:

one or more processors; and at least one non-transitory computer readable memory connected to the one or more processors and including computer program code, wherein the at least one non-transitory computer readable memory and the computer program code are configured, with the one or more processors, to cause the first communication device to at least perform:

receiving a first data packet in a first direction from a second communication device, wherein the first direction is one of an uplink direction or a downlink direction;

acquiring, by the first communication device, from a third communication device, policy rule information of the second communication device, wherein the policy rule information comprises at least an uplink transmission delay requirement for a service and further comprises a downlink transmission delay requirement for the service;

receiving a second data packet in a second direction, wherein the second direction is one of an uplink direction or a downlink direction that is different from the first direction;

adjusting a quality of service parameter of the second data packet in the second direction prior to sending the second data packet, and in response to a transmission delay requirement for the second direction not meeting a target transmission delay in the second direction, wherein the transmission delay requirement for the second direction is one of the uplink transmission delay requirement or the downlink transmission delay requirement of the policy rule information; and sending the second data packet in the second direction based on the quality of service parameter and further based on a total transmission delay requirement and a time point at which the first data packet in the first direction is sent from the second communication device;

wherein the first data packet in the first direction comprises a time stamp that indicates the time point at which the first data packet in the first direction is sent from the second communication device, wherein the first data packet in the first direction and the second data packet in the second direction correspond to a same service, wherein the second data packet is a response to the first data packet, and wherein the total transmission delay requirement is a sum of the uplink transmission delay requirement and the downlink transmission delay requirement.

9. The communication device according to claim 8, wherein the first data packet in the first direction comprises a group identifier, wherein the second data packet in the second direction comprises a group identifier, and wherein the computer program code further includes computer program code for:

determining, if the group identifier of the second data packet in the second direction has an association relationship with the group identifier of the first data packet in the first direction, that the first data packet in the first direction and the second data packet in the second direction correspond to the same service.

10. The first communication device according to claim 8, wherein the computer program code further includes computer program code for:

determining a transmission delay in the first direction based on a time point at which the first data packet in the first direction is received and the time point at which the first data packet in the first direction is sent from the second communication device;

determining a target transmission delay in the second direction based on a difference between the total transmission delay requirement and the transmission delay in the first direction; and sending the second data packet in the second direction based on the target transmission delay in the second direction.

11. The first communication device according to claim 8, wherein the computer program code for sending the second data packet in the second direction based on the total transmission delay requirement and the time point at which the first data packet in the first direction is sent from the second communication device comprises computer program code for:

determining a target transmission delay in the second direction based on a difference between the total transmission delay requirement and a duration, wherein the duration is between a time point at which the first communication device receives the second data packet in the second direction and the time point at which the first data packet in the first direction is sent from the second communication device; and sending the second data packet in the second direction based on the target transmission delay in the second direction.

12. The first communication device according to claim 10, wherein the adjusting the quality of service parameter comprises performing at least one of:

reducing a transmission delay in the quality of service parameter of the second data packet in the second direction;

increasing a sending priority of the second data packet in the second direction;

increasing a service transmission bit rate in the second direction; or decreasing a service packet loss rate.

13. The first communication device according to claim 8, wherein the computer program code further includes computer program code for:

obtaining the total transmission delay requirement of the service through a session establishment procedure or a session modification procedure.

14. A communication system, comprising:

a first communication device configured to:

receive a first data packet in a first direction from a second communication device, wherein the first direction is one of an uplink direction or a downlink direction;

acquire, from a third communication device, policy rule information of the second communication device, wherein the policy rule information comprises at least an uplink transmission delay requirement for a service and further comprises a downlink transmission delay requirement for the service;

receive a second data packet in a second direction, wherein the second direction is one of an uplink direction or a downlink direction that is different from the first direction;

adjust a quality of service parameter of the second data packet in the second direction prior to sending the second data packet, and in response to a transmission delay requirement for the second direction not meeting a target transmission delay in the second direction, wherein the transmission delay requirement for the second direction is one of the uplink transmission delay requirement or the downlink transmission delay requirement of the policy rule information; and send the second data packet in the second direction based on a total transmission delay requirement and a time point at which the first data packet in the first direction is sent from the second communication device, wherein the first data packet in the first direction comprises a time stamp that indicates the time point at which the first data packet in the first direction is sent, wherein the first data packet in the first direction and the second data packet in the second direction correspond to a same service, and wherein the total transmission delay requirement is a sum of the uplink transmission delay requirement and the downlink transmission delay requirement; and an application server configured to:

receive, when the first direction is the uplink direction and the second direction is the downlink direction, the first data packet in the first direction from the first communication device, and send the second data packet in the second direction to the first communication device; or send, when the first direction is the downlink direction and the second direction is the uplink direction, the first data packet in the first direction to the first communication device, and receive the second data packet in the second direction from the first communication device;

wherein the second communication device is one of the application server or a terminal device, and wherein the second data packet is a response to the first data packet.

15. The communication system according to claim 14, wherein the first data packet in the first direction comprises a group identifier, wherein the second data packet in the second direction comprises a group identifier, and wherein the first communication device is further configured to:

determine, if the group identifier of the second data packet in the second direction has an association relationship with the group identifier of the first data packet in the first direction, that the first data packet in the first direction and the second data packet in the second direction correspond to the same service.

16. The communication system according to claim 14, wherein the first communication device being configured to send the second data packet in the second direction comprises:

determining a transmission delay in the first direction based on a time point at which the first data packet in the first direction is received and the time point at which the first data packet in the first direction is sent from the second communication device;

determining a target transmission delay in the second direction based on a difference between the total transmission delay requirement and the transmission delay in the first direction; and sending the second data packet in the second direction based on the target transmission delay in the second direction.

17. The communication system according to claim 14, wherein the first data packet in the first direction comprises a group identifier, and the second data packet in the second direction comprises a group identifier; and wherein the first communication device is further configured to determine, if the group identifier of the second data packet in the second direction has an association relationship with the group identifier of the first data packet in the first direction, that the first data packet in the first direction and the second data packet in the second direction correspond to the same service.

18. The communication system according to claim 14, wherein the first communication device is further configured to:

determine a transmission delay in the first direction based on a time point at which the first data packet in the first direction is received and the time point at which the first data packet in the first direction is sent;

determine a target transmission delay in the second direction based on a difference between the total transmission delay requirement and the transmission delay in the first direction; and send the second data packet in the second direction based on the target transmission delay in the second direction.

19. The communication system according to claim 18, wherein the adjusting the quality of service parameter comprises performing at least one of:

reducing a transmission delay in the quality of service parameter of the second data packet in the second direction;

increasing a sending priority of the second data packet in the second direction;

increasing a service transmission bit rate in the second direction; or decreasing a service packet loss rate.

20. The communication system according to claim 14, wherein the first communication device is further configured to:

obtain the total transmission delay requirement of the service through a session establishment procedure or a session modification procedure.

* * * * *